United States Patent [19]

Allen

[11] Patent Number: 5,586,218

[45] Date of Patent: Dec. 17, 1996

[54] AUTONOMOUS LEARNING AND REASONING AGENT

[75] Inventor: Bradley P. Allen, Hermosa Beach, Calif.

[73] Assignee: Inference Corporation, Novato, Calif.

[21] Appl. No.: 518,850

[22] Filed: Aug. 24, 1995

Related U.S. Application Data

[63] Continuation of Ser. No. 869,926, Apr. 15, 1992, abandoned, which is a continuation-in-part of Ser. No. 664,561, Mar. 4, 1991, abandoned.

[51] Int. Cl.⁶ .................................................. G06F 15/18
[52] U.S. Cl. ............................ 395/10; 395/50; 395/51; 395/75; 395/77; 395/11; 395/13
[58] Field of Search ................................. 395/10, 50, 51, 395/75, 77, 11, 13, 600, 934

[56] References Cited

U.S. PATENT DOCUMENTS

| | | | |
|---|---|---|---|
| 4,648,062 | 3/1987 | Johnson et al. | 364/900 |
| 4,930,071 | 5/1990 | Tou et al. | 364/300 |
| 4,991,087 | 2/1991 | Burkowski et al. | 364/200 |
| 5,020,019 | 5/1991 | Ogawa | 364/900 |
| 5,062,074 | 10/1991 | Kleinberger | 364/900 |
| 5,099,426 | 3/1992 | Carlgren et al. | 364/419 |
| 5,103,498 | 4/1992 | Lanier et al. | 395/68 |
| 5,122,972 | 6/1992 | Richards et al. | 395/157 |
| 5,136,686 | 8/1992 | Koza | 395/13 |
| 5,140,692 | 8/1992 | Morita | 395/600 |
| 5,168,565 | 12/1992 | Morita | 395/600 |
| 5,201,048 | 4/1993 | Coulter et al. | 395/600 |
| 5,224,206 | 6/1993 | Simoudis | 395/77 |
| 5,255,386 | 10/1993 | Prager | 395/600 |
| 5,287,448 | 2/1994 | Nicol et al. | 395/159 |
| 5,301,314 | 4/1994 | Gifford et al. | 395/600 |
| 5,303,361 | 4/1994 | Colwell et al. | 395/425 |

FOREIGN PATENT DOCUMENTS

| | | | |
|---|---|---|---|
| 0233071 | 6/1986 | European Pat. Off. | G05B 13/02 |

OTHER PUBLICATIONS

Riesbeck, C. K.,–"An Interface for Case–Based Knowledge Acquisition," Proc. Workshop on Case–Based Reasoning, May 1988, 312–326.

Shafer, D., "CBR Express: Getting Down to Cases," Jul./Aug. 1991, PCAI, 42–45.

Integrating Case–Based Reasoning With Genetic Algorithms; Computational Intelligence, III; Oppacher et al; Conference Date 24–28 Sep. 1990; pp. 103–114.

Combining Case–Based And Rule Based Reasoning: A Heuristic Approach; IJCAI 1989; Rissland Et Al; vol. 1; pp. 524–530.

Explanation Based Indexing Of Cases; Proc. Of AAAI–88; Barletto Et Al; Aug. 1988.

(List continued on next page.)

Primary Examiner—Robert W. Downs
Attorney, Agent, or Firm—D'Alessandro & Ritchie

[57] ABSTRACT

A software agent which performs autonomous learning in a real-world environment, implemented in a case-based reasoning system and coupled to a sensor for gathering information from, and to an effector for manipulating, its environment. A case base which is tuned in response to an evaluation of how well the agent is operating in that environment. A memory of cases, the contents of that memory being determined by a genetic technique, including producing new cases which may never have been encountered in the environment, evaluating cases in response to a history of previous matches and in response to an external stimulus, and selecting a limited set of cases which provides a preferred model of the environment. A selection technique based on multiple measures, such as match quality, case accuracy, or case utility, which may induce experimentation by the autonomous agent, such as by employing a random or pseudorandom effect in selecting cases, and which may also distinguish between those actions which solve problems and those actions which gather further information so as to better solve problems. Multiple autonomous agents may form a collective entity and may cooperate to select an action to be performed by that collective entity.

20 Claims, 5 Drawing Sheets

OTHER PUBLICATIONS

A Generalized Case Based Reasoning System For Personnel Performance Evaluation; Proc. 24th Annual Hawaii Inter. Conf. On System Sciences; Chi Et Al; 8–11 Jan. 1991; pp. 82–89.

Credit Assignment And The Problem Of Competing Factors In Case–Based Reasoning; Proc. Workshop On Case–Based Reasoning; Rissland Et Al; May 10–13, 1988; pp. 327–344.

Case Based Reasoning For Continuous Control; Proc. Workshop On Case–Based Reasoning; Kopeikina Et Al; May 10–13, 1988; pp. 250–259.

Some Experiments With Case–Based Search; Proc. Workshop On Case–Based Reasoning; Bradtke Et Al; May 10–13, 1988; pp. 80–93.

Clavier: A Case Based Autoclave Loading Advisor; David Hinkle; Mar. 9, 1990.

Using A Case Memory To Integrate Case–Based And Causal Reasoning; Case–Based Reasoning Workshop; Phyliss Koton; Aug. 23, 1988; pp. 74–81.

Oppacher, et al.; "Integrating Case–Based Reasoning with Genetic Algorithms," in Computational Intelligence III (Sep. 24–28, 1990), pp. 103–114.

Handelman, et al.; "Ingegrating Neural Networks and Knowledge–Based Systems for Intelligent Robotic Control," in IEEE Control Systems Magazine (Apr. 30, 1990), pp. 77–87.

Aleksander, et al; "The Cognitive Challlenge for Neural Architectures," in International Neural Network Conference (Jul. 9–13, 1990), pp. 627–630.

Isik, et al.; "Pilot Level of a Hierarchical Controller for an Unmanned Mobile Robot," in 4:3 IEEE Journal of Robotics and Automation (Jun. 1988), pp. 241–255.

MacNiel, "Capturing Multimedia Design Knowledge Using TYRO, the Constraint Based Designer's Apprentice", in Image Handling And Reproduction Sysems Integration (1991) pp. 94–102.

C. Lee, "Case–based reasoning for robotic assembly cell diagnosis", in Expert Robots For Industrial Use (1988), pp. 241–246.

Venta, O. and Kohonen, T., *A Content–Addressing Software Method for the Emulation of Neural Networks*, Helsinki University of Technology (1991).

Allen, B. P. and Lee, S. D., *A Knowledge–Based Environment for the Development of Software Parts Composition Systems*, Proceedings of the 11th International Conference on Software Engineering, IEEE, May, 1989.

Willett, P., *Recent Trends in Hierarchic Document Clustering: A Critical Review*, Information Processing & Management, vol. 24, No. 5, pp. 577–597, 1988.

Cutting, D. R., Karger, D. R., Pedersen, J. O. and Tukey, J. W., *Scatter/Gather: A Cluster–based Approach to Browsing Large Document Collections*, 15th Ann. Int'l SIGIR 1992.

Can, F. and Ozkarahan, E. A., *Dynamic Cluster Maintenance*, Information Processing & Management, vol. 25, No. 3, pp. 275–291, 1989.

Parodi, A. and Bonelli, P., *The Animat and the Physician*, pp. 50–57, (1991).

Brooks, R. A., *Elephants Don't Play Chess*, Robotics and Autonous Systems 6, pp. 3–15, 1990.

Allen, B. P., *Case–Based Reasoning in a Software Information System*, Inference (1991).

Wood, M. and Sommerville, I., *An Information Retrieval System for Software Components*, ACM SIGIR, vol. 22, Issue 3, 4, Spring/Summer 1988.

Frakes, W. B. and Nejmeh, B. A., *Sofware Reuse Through Information Retrieval*, Proceedings of IEEE Spring COMPCON '87, Mar. 1987.

Stone, H. S., *Parallel Querying of Large Databases: A Case Study*, Computer, Oct. 1987.

Batz, J. C., Chohen, P. M., Redwine, S. T. and Rice, J. R., *The Application–Specific Task Area*, Computer, Nov. 1983.

Arnold, S. P. and Stepoway, S. L., *The REUSE System: Cataloging and Retrieival of Reusable Software*, Proceedings of IEEE Spring COMPCON '87, Mar. 1987.

Prieto–Diaz, R. and Freeman, P. *Classifying Software for Reusability*, IEEE Software, vol. 4, No. 1, Jan. 1987.

Aha, D. W., Kibler, D. and Albert, M. K., *Instance–Based Learning Algorithms*, Machine Learning, vol. 1, No. 1, Jan. 1991.

Steinberg, L. I., *Design as Refinement Plus Constraint Propagation: The Vexed Experience*, Proceedings of the National Conference on Artificial Intelligence, AAAI, Jul. 1987.

Patel–Schneider, P. F., Brachman, R. J. and Levesque, H. J. *ARGON: Knowledge Representation meets Information Retrieval*, Proceedings of the First Conference on Applications of Artificial Intelligence, IEEE, Dec. 1984.

Kolodner, J. L., Simpson, R. L. Jr., and Sycara–Cyranski, K. *A Process Model of Cased–Based Reasoning in Problem Solving*, Proceedings of the Ninth International Joint Conference on Artificial Intelligence, Aug. 1985.

Yen, J., Neches, R. and DeBellis, M., *Specification by Reformulation: A Paradigm for Building Integrated User Support Environments*, Proceedings of the National Conference on Artificial Intelligence, AAAI, Aug. 1988.

Fischer, G. and Nieper–Lemke, H., *HELGON: Extending the Retrieval by Reformulation Paradigm*, Proceedings of CHI '89 Human Factors in Computing Systems ACM, Apr.–May 1989.

Frakes, W. B. and Gandel, P. B., *Representation Methods for Software Reuse*, Proceedings of TRI–Ada 89, Oct. 1989.

Harandi, M. T. and Young, F. H., *Template Based Specification and Design*, Proceedings of the 3rd International Workshop on Software Specification and Design, IEEE, Aug. 1985.

Marcus, S., *SALT: A Knowledge Acquisition Tools for Propose–and–Revise Systems*, Automating knowledge Acquisition for Expert Systems, Marcus, S., Eds., Kluwer Academic, 1988.

Selby, R. W., *Quantitative Studies of Software Reuse*, Software Reusability, vol. 2, ACM Press, 1989.

Lanergan, R. G. and Grasso, C. A., *Software Engineering with Reusable Designs and Code*, Software Reusability, vol. 2, ACM Press, 1989.

Yost, G. R. and Newell, A., *A Problem Space Approach to Expert System Specification*, Proceedings of the Eleventh IJCAI, Aug. 1989.

Stottler, R. H., Henke, A. L. and King, J. A., *Rapid Retrieval Algorithms for Case–Based Reasoning*, Proceedings of the Eleventh International Joint Conference on Artificial Intelligence, Aug. 1989.

Devanbu, P., Selfridge, P. G., Ballard, B. W. and Brachman, R. J., *A Knowledge–Based Software Information System*, Proceeding of the Eleventh International Joint Conference on Artificial Intellignece, Aug. 1989.

Embley, D. W. and Woodfield, S. N., *A Knowledge Structure for Reusing Abstract Data Types*, Proceedings of the 9th International Conference on Software Engineering, IEEE, Mar.–Apr. 1987.

Allen, B. P. and Lee, S. D., *A Knowledge–Based Environment for the Development of Software Parts Composition Systems*, Proceedings of the 11th International Conference on Software Engineering, IEEE, May 1989.

Bareiss, E. R. and Porter, B. W., *PROTOS: An Exemplar–Based Learning Apprentice*, Proceedings of the Fourth International Workshop on Machine Learning, Jun. 1987.

Kolodner, J. L., *Improving Human Decision Making through Case–Based Decision Aiding*, AI Magazine, vol. 2, No. 2, Summer 1991.

Williams, M. D., *What makes RABBIT run?*, International Journal of Man–Machine Studies, vol. 21, 1984.

Williams, R. S., *Learning to Program by examining and Modifying Cases*, Proceedings of the DARPA Workshop on Case–Based Reasoning, May 1988.

Venta, O. and Kohonen, T., *A Content–Addressing Software Method for the Emulation of Neural Networks*, Proceedings of the IEEE International Conference on Neural Networks 1988, Jul. 1987.

Williams, M. D., *The Process of Retrieval from Very Long–Term Memory*, Cognitive Science 5, 1981.

Stanfill, C. and Waltz, D. L., *The Memory–Based Reasoning Paradigm*, Proceedings of the DARPA Workshop on Case–Based Reasoning, May 1988.

Koton, Phyllis, *Reasoning about Evidence in Causal Explanations*, MIT Laboratory for Computer Science, Procedural Workshop on Case–Based Reasoning, pp. 260–270, (May 13, 1993).

Risch, T. et al., *A Functional Approach to Integrating Database and Expert Systems*, Communications of the ACM, vol. 31, No. 12, pp. 1424–1437, Dec. 1988.

Subcontract No. 036 Between University of Houston Clear–Lake and Inference Corporation, Mar. 1989.

Subcontract No. 087 Between University of Houston Clear–Lake and Inference Corporation, May 1991.

Simoudis, et al., "The Application of CBR to Help Desk Applications," Proceedings of the 1991 DARPA Case–Based Reasoning Workshop, May 1991.

Kolodner, "Extending Problem Solver Capabilities Through Case–Based Inference," Proc. 4th Annual Inter. Machine Learning Workshop, pp. 21–30, 1987.

Frakes, et al., "Using Expert System Components to Add Intelligent Help and Guidance to Software Tools," AT & T Bell Laboratories, Sep. 1989.

Prager, et al., "REASON An Intelligent User Assistant for Interactive Environments," IBM Systems Journal, vol. 29, No. 1, 1990, pp. 141–164.

Breuker, et al., "A Shell for Intelligent Help Systems," Cognitive Modeling, Dec. 1987, pp. 167–173.

Skalak, "Options for Controlling Mixed Paradigm Systems," Proc. Workshop on Case Based Reasoning, Jun. 1989, pp. 318–323.

Simoudis, et al., "Validated Retrieval in Case–Based AAA I–90," Aug. 1990, pp. 310–315.

Pallatto, "New ART–IM features to aid expert system development," PC Week, Aug. 27, 1990, 67(2).

Goodman, "Prism: A Case Based Texex Classifier," Pro. Innovative Applications of Artificial Intelligence 2, 1990, pp. 25–37.

Software Product Specification for ESTEEM VI.I, Esteem Software, Inc. Released 1991.

Kamel, et al., "Fuzzy Query Processing Using Clustering Techniques," Information Processing & Management, vol. 26, No. 2, pp. 279–293, 1990.

Sachs, "An Approach to Associate Retrieval through the Theory of Fuzzy Sets," Journal of the American Society for Information Sciences, Mar.–Apr., pp. 85–87, 1976.

Salton, et al., "Introduction to Modern Information Retrieval," pp. 59–75 and 421–426, 1983.

Beutler, "The Descriptive Search to Realize a Knowledge–Based Retrieval of Reusable Project Results," Artificial Intelligence in Real–Time Control, pp. 109–112, 1988.

Salton, et al., "Term Weighting Approaches in Automatic Text Retrieval," Information Processing & Management, vol. 24, No. 5, pp. 513–523, 1988.

Maarek, et al., "Full Text Indexing Based on Lexical Relations An Application: Software Libraries," Proceedings of The International Conference on Research and Development in Information Retrieval, pp. 198–205, 1989.

Kochen, et al., "On the Precision of Adjectives which Denote Fuzzy Sets," Journal of Cybernetics, pp. 49–59, 1974.

McNarmara, "An Application of Cyclomatic Complexity Metrics to Microcode," IBM Technical Report No. 01.A517, Mar. 22, 1988.

Klir, "Is There More to Uncertainty Than Some Probability Theorists Might Have Us Believe?," International Journal of General Systems, vol. 15, pp. 347–378, 1989.

Leung, et al., "Fuzzy Concepts in Expert Systems," Computer, pp. 48–56, Sep. 1988.

Salton, et al., "Introduction to Modern Information Retrieval," McGraw Hill, Chapter 3 pp. 52–115, Chapter 4 pp. 146–151, Chapter 7 pp. 287–297, Chapter 10 pp. 421–422, 1983.

Bookstein, "Fuzzy Requests: An Approach to Weighted Boolean Searches," Journal of the American Society for Information Science, pp. 240–247, Jul. 1980.

Tahani, "A Fuzzy Model of Document Retrieval Systems," Information Processing & Management, vol. 12, pp. 177–187, 1976.

Radecki, "Mathematical Model of Information Retrieval system Based on the Concept of Fuzzy Thesaurus," Information Processing & Management, vol. 12, pp. 313–318, 1976.

Miyamoto, et al, "Fuzzy Information Retrieval Based on a Fuzzy Pseudothesaurus," IEEE Transactions on Systems, Man and Cybernetics, vol. SMC–16, No. 2, pp. 278–282, Mar./Apr. 1986.

Cisler, "Searching for a Better Way: Verity, INC's Topic Software," Online, pp. 99–102, Nov. 1988.

Chong, "Feature Software Review: Product: Topic," Library Software Review, pp. 281–284, Sep./Oct., 1989.

KNOBOTS IN DIAGNOSIS AND REPAIR

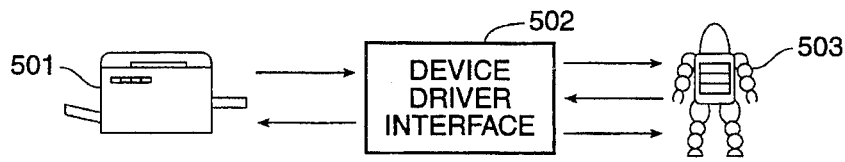

| GOALS | ELIMINATE NEED FOR USER INVOLVEMENT IN MAINTENANACE, ANTICIPATE FAILURES FOR PREVENTATIVE MAINTENANCE |
|---|---|
| STIMULI | DEVICE SENSOR READINGS, USER AND DEALER COMMANDS |
| ACTIONS | DEVICE DRIVER OUTPUTS, DIAGNOSTIC AND REPAIR MESSAGES |
| REINFORCEMENT | NEGATIVE IF DEVICE FAILS |
| BENEFITS | GREATLY INCREASED MEAN-TIME-BETWEEN-FAILURE |

*FIG.5*

KNOBOTS IN CUSTOMER SERVICE

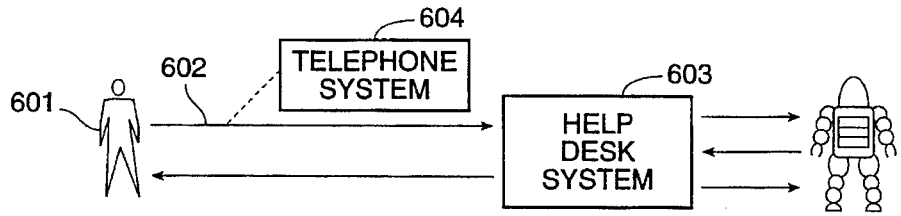

| GOALS | RESPONSIVELY HANDLE CUSTOMER PHONE CALLS AND AUTOMATICALLY RESOLVE PROBLEM |
|---|---|
| STIMULI | TOUCH-TONE COMMANDS, VOICE RESPONSE UNIT MESSAGES |
| ACTIONS | VOICE RESPONSE OUTPUT, PBX TRANSFERS |
| REINFORCEMENT | POSITIVE IF DIALOG COMPLETED, NEGATIVE IF CALLER HANGS UP BEFORE PROBLEM RESOLUTION OR TRANSFER |
| BENEFITS | FOCUSED, RESPONSIVE USER INTERFACE THAT ADAPTS TO USER BEHAVIOR |

*FIG.6*

KNOBOTS IN KNOWLEDGE DISCOVERY

| GOALS | LEARN USEFUL KNOWLEDGE ABOUT PATTERNS IN DATA |
| --- | --- |
| STIMULI | DATABASE TABLES AND SCHEMA DEFINITIONS |
| ACTIONS | DATABASE QUERIES AND TRANSACTIONS |
| REINFORCEMENT | POSITIVE IF USEFUL INFORMATION DISCOVERED |
| BENEFITS | IMPROVED ABILITY TO GENERALIZE FROM DATA AND CAPTURE USEFUL REGULARITIES FOR COMPETITIVE ADVANTAGE |

5,586,218

AUTONOMOUS LEARNING AND REASONING AGENT

CROSS-REFERENCE TO RELATED APPLICATION

This application is a file-wrapper continuation of patent application Ser. No. 07/869,926, filed Apr. 15,1992, now abandoned which is a continuation-in-part of application Ser. No. 07/664,561, filed Mar. 4, 1991, now abandoned, in the name of inventors Bradley P. Allen and S. Daniel Lee and titled "CASE-BASED REASONING SYSTEM", hereby incorporated by reference as if fully set forth herein.

BACKGROUND OF THE INVENTION

1. Field of the Invention

This invention relates to case-based reasoning and to a case-based reasoning system which performs autonomous learning in a real-world environment.

2. Description of Related Art

While computers are capable of tremendous processing power, their ability to use that processing power for reasoning about complex problems has so far been limited. Generally, before a computer can be used to address a complex problem, such as one which requires the attention of a human expert, it has been necessary to distill the knowledge of that expert into a set of inferential rules (a "rule base") which allow an automated processor to reason in a limited field of application. While this method has been effective in some cases, it has the natural drawback that it often requires a substantial amount of time and effort, by both computer software engineers and experts in the particular field of application, to produce a useful product.

Moreover, rule-based systems of this type present a difficult programming task. Unlike more prosaic programming tasks, constructing a rule base is sometimes counter-intuitive, and may be beyond the ability of many application programmers. And once a rule-based system has been constructed based on the knowledge of a human expert, it may be difficult to accommodate changes in the field of operation in which the processor must operate. Such changes might comprise advances in knowledge about the application field, additional tasks which are intended for the processor, or changes in or discoveries about the scope of the application field.

One proposed method of the prior art is to build automated reasoning systems which operate by reference to a set of exemplar cases (a "case base"), to which the facts of a particular situation (the "problem") may be matched. The processor may then perform the same action for the problem as in the exemplar case. While this proposal has been well-received, case-based systems of this type may still require a substantial amount of human effort to identify exemplar cases and present a processor with sufficient information that cases may be matched and acted upon. For example, it may be necessary to deduce or supply extensive information about a complex environment so as to determine a preferred set of exemplar cases.

A parent copending application, Ser. No. 07/664,561, filed Mar. 4, 1991, discloses inventions in which a case-based reasoning system is smoothly integrated into a rule-based reasoning system, and in which an automated reasoning system may dynamically adapt a case base to problems which it encounters. An aspect of the inventions disclosed in that application also includes a technique in which a system may be set to work with a limited case base, and may solicit human advice for treatment of new problems which are not already well-treated by the case base, thus learning how to do its job on a dynamic basis.

Another application, Ser. No. 07/869,935, now abandoned, filed the same day as this application, discloses inventions in which a machine learning system may operate in conjunction with a relational database system, and particularly in which a machine learning system may operate in conjunction with a relational database system with an SQL interface. This allows the machine learning system to use high-speed searching power of computer systems which have been designed for use with relational database systems with an SQL interface, and allows the machine learning system to be smoothly integrated into computer systems which have relational databases, even if those databases were not designed to work with learning or reasoning systems of any kind.

It would be advantageous if an automated reasoning system could dynamically create its own case base in response to problems which it encounters, thus learning how to do its job on a dynamic basis and without substantial human intervention, or at least with only occasional human intervention. Limited intervention would allow an automated reasoning system to examine a larger set of cases and to determine a preferred set of exemplar cases without an external agent, such as a human operator, having to deduce or supply extensive information about a complex environment.

It would also be advantageous if an automated reasoning system could operate autonomously in a complex environment, possibly with external intervention such as positive or negative reinforcing stimuli. External stimuli might be in response to a result of the system's attempts to manipulate its environment, or might be provided by an external agent, such as a human operator. Accordingly, it is an object of the invention to provide an automated reasoning system which does not require intervention for every case.

SUMMARY OF THE INVENTION

The invention provides a software agent which performs autonomous learning in a real-world environment. The autonomous agent may learn by reinforcement (including positive and negative, and delayed and sporadic, reinforcement), in addition to learning by example and learning by being told what to do. In a preferred embodiment, the autonomous agent may be implemented in a case-based reasoning system, which may be coupled to a sensor for gathering information from, and to an effector for manipulating, its environment (which may comprise a software environment, a physical environment, or some combination thereof). In addition to gathering a case base of experience in its environment, the autonomous agent may tune that case base in response to an evaluation of how well it is operating in that environment. The evaluation may be its own, or may be in response to a stimulus such as a reward or punishment. In addition to taking action on a problem based on its case base, the autonomous agent may take action to gather information so as to determine which cases are most appropriate to that problem.

In a preferred embodiment, the autonomous agent may comprise a memory of cases, the contents of that memory being determined by a genetic technique for producing, evaluating and selecting cases. New cases may be produced by inspection of scenarios from the environment, by mutation of old cases, or by combining or selecting features from old cases; thus the memory may comprise cases the autonomous agent has never encountered in the environment. The stored cases may be evaluated in response to a history of previous matches and in response to an external stimulus, and evaluations (such as measures of accuracy and utility) may be associated with stored cases. The contents of the memory may be limited to a set of cases which provides a preferred model of the environment, such as those cases which have the better evaluations.

In a preferred embodiment, the autonomous agent may comprise a selection technique based on multiple factors, such as match quality, case accuracy, or case utility. The selection technique may also induce experimentation by the autonomous agent, such as by employing a random or pseudorandom effect in selecting cases. The selection technique may also distinguish between those actions which solve problems and those actions which gather further information so as to better solve problems. Multiple autonomous agents may form a collective entity and may cooperate to select an action to be performed by that collective entity.

BRIEF DESCRIPTION OF THE DRAWINGS

FIG. 5 shows a block diagram of an intelligent office equipment device including an autonomous agent.

FIG. 6 shows a block diagram of a customer service system with a help-desk system including an autonomous agent.

Appendix A shows an example software environment and autonomous agent for distinguishing between classes of irises.

DESCRIPTION OF THE PREFERRED EMBODIMENT

An embodiment of this invention may be used together with inventions which are disclosed in a copending application titled "MACHINE LEARNING WITH A RELATIONAL DATABASE", application Ser. No. 07/869,935, filed the same day in the name of the same inventor, hereby incorporated by reference as if fully set forth herein.

Figure 1:
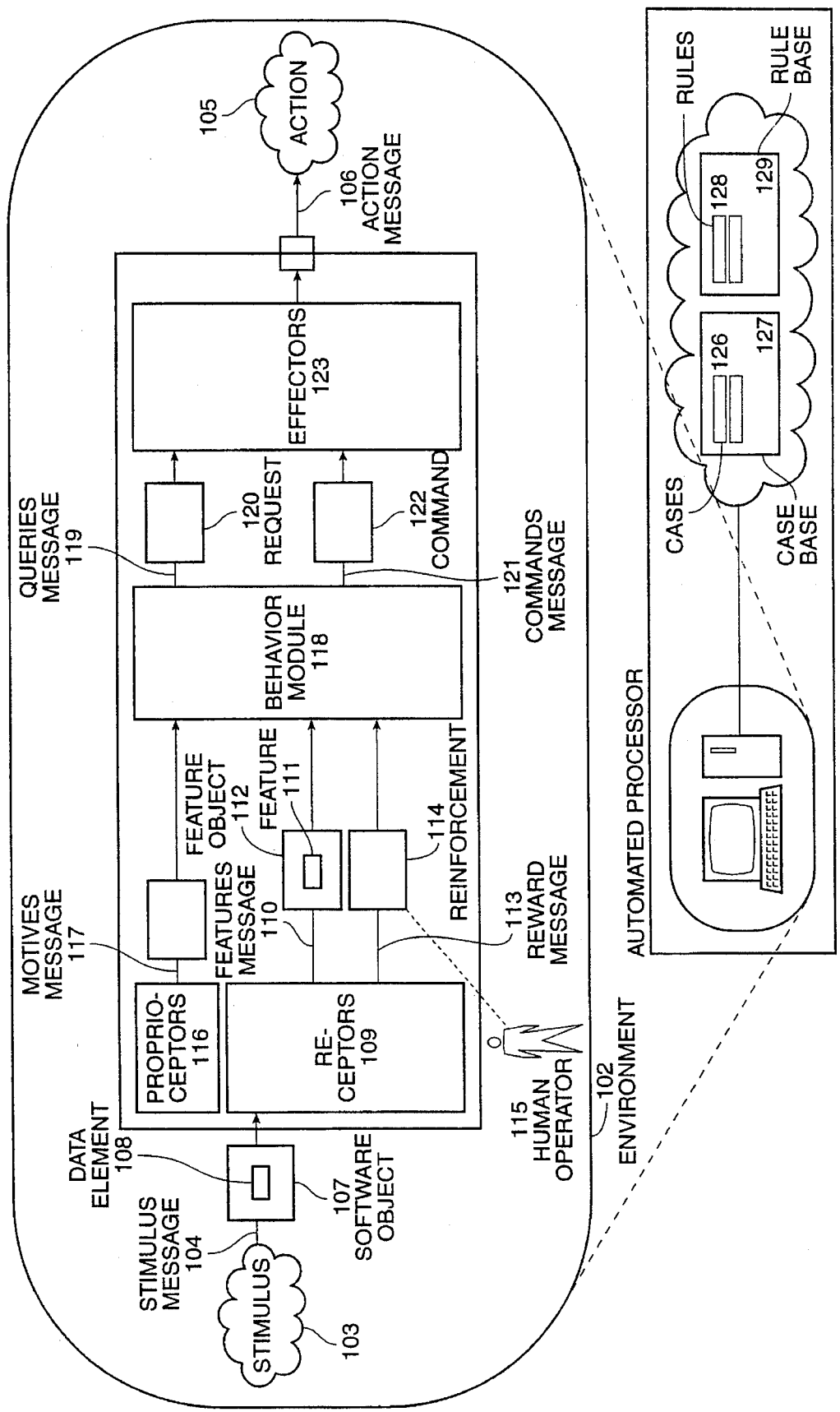
FIG. 1 shows a block diagram of an autonomous agent embedded in a complex environment.

FIG. 1 shows a block diagram of an autonomous agent embedded in a complex environment.

A software agent 101 may be embedded in an environment 102 so that the agent 101 may receive a stimulus 103 from the environment 102 by receiving a stimulus message 104, and may perform an action 105 which affects the environment 102 by sending an action message 106. In a preferred embodiment, the stimulus message 104 and the action message 106 may each comprise a manipulable software object 107 and may transmit that software object 107 from source to destination. Software objects 107 may comprise data elements 108 and relations to other software objects 107 as is well known in the art. Object-oriented systems are more fully described in "Object-Oriented Design With Applications" by Grady Brooch, published by Benjamin/Cummings Publishing, Redwood City, Calif. (1991), hereby incorporated by reference as if fully set forth herein.

In a preferred embodiment, the environment 102 may comprise either a software environment or a physical environment, or some combination thereof. For example, the environment 102 may comprise a physical room; the agent 101 may receive a LIGHTS stimulus message 104 telling if a set of lights in the room is off or on; and the agent 101 may send a LIGHTS-ON action message 106 to turn on the lights. Alternatively, the environment 102 may comprise a graphic database; the agent 101 may receive a PICTURE stimulus message 104 telling about a picture in the database; and the agent 101 may send an ADD-PROPERTY action message 106 to add a property value (e.g., "author=Vermeer") to the picture.

A set of receptors 109 may receive the stimulus message 104 and generate a features message 110. In a preferred embodiment, the receptors 109 may map a set of aspects or features 111 of the environment 102 (especially those relating to external stimuli) into a set of feature objects 112, which may comprise software objects 107 which describe the aspects or features 111 of the environment 102. For example, the environment 102 may comprise an oil refinery and the feature objects 112 may comprise temperature and pressure values at various positions in the refinery.

The set of receptors 109 may also generate a reward message 113, which may comprise a scalar-valued reinforcement 114 which measures what success the agent 101 is having with the environment 102. In a preferred embodiment, the value of the reinforcement 114 may be determined by the receptors 109, or may be externally supplied, such as from a human operator 115. For example, the environment 102 may comprise a loan portfolio database and the reinforcement 114 may measure loan performance, or the environment 102 may comprise a music audio database and the reinforcement 114 may be entered by the human operator 115 after listening to selections made by the agent 101.

A set of proprioceptors 116 may generate a motives message 117, which may comprise software objects 107 which describe goals or needs of the agent 101. In a preferred embodiment, the proprioceptors 116 may map aspects or features of the environment 102 (especially those relating to internal states of the agent 101 itself) into those goals or needs. The goals or needs of the agent 101 itself are thus a kind of feature 111 which the agent 101 may consider, and are similar to the features 111 which are reported by the receptors 109. For example, the environment 102 may comprise a piece of office equipment such as a photocopier and the motives message 117 may comprise internally generated features 111 such as the need for new ink or paper. The proprioceptors 116 may be altered by a designer so as to change the essential goals of the agent 101.

A behavior module 118 may receive the motives message 117, the features message 110 and the reward message 113, and may generate a queries message 119, which may comprise software objects 107 which describe a request 120 by the agent 101 for further information, and a commands message 121, which may comprise software objects 107 which describe a command 122 by the agent 101 to affect the environment 102. In a preferred embodiment, the behavior module 118 may comprise one like that disclosed with FIG. 2.

A set of effectors 123 may receive the queries message 119 and the commands message 121 and generate the action message 106. In a preferred embodiment, the action message 106 may be coupled to the environment 102 (e.g., a physical device or another software element) and may cause an effect in the environment 102. For example, the environment 102 may comprise a chess program and the action message 106 may direct the chess program to make a particular move on behalf of the agent 101.

In a preferred embodiment, the software agent 101 may be implemented with an automated processor 124, which may execute a software inference engine 125 for reasoning using a set of cases 126 in a case base 127 and a set of rules 128 in a rule base 129. In a preferred embodiment, the processor 124 may comprise a system having a processor, memory comprising a stored program, memory comprising data, and input/output devices, as is well known in the art. The operation and software structures of this system are described herein in terms of their functions and at a level of detail which would be clear to those of ordinary skill in the art. It would be clear to anyone of ordinary skill in the art, after perusal of the specification, drawings and claims herein, that modification and/or programming (using known programming techniques) of a processor of known design to achieve these functions would be a straightforward task and would not require undue experimentation.

In a preferred embodiment, the processor 124 may comprise an IBM-compatible PC configured to be able to execute the MicroSoft Windows 3.0 and DOS 3.1 software, and having a hard disk drive, a mouse, and a VGA display. At least a 286 processor with four megabytes of memory is preferred; a 386 processor with eight megabytes of memory is more preferred. The MicroSoft Windows 3.0 software is preferably executed in 386 enhanced mode.

Figure 2:
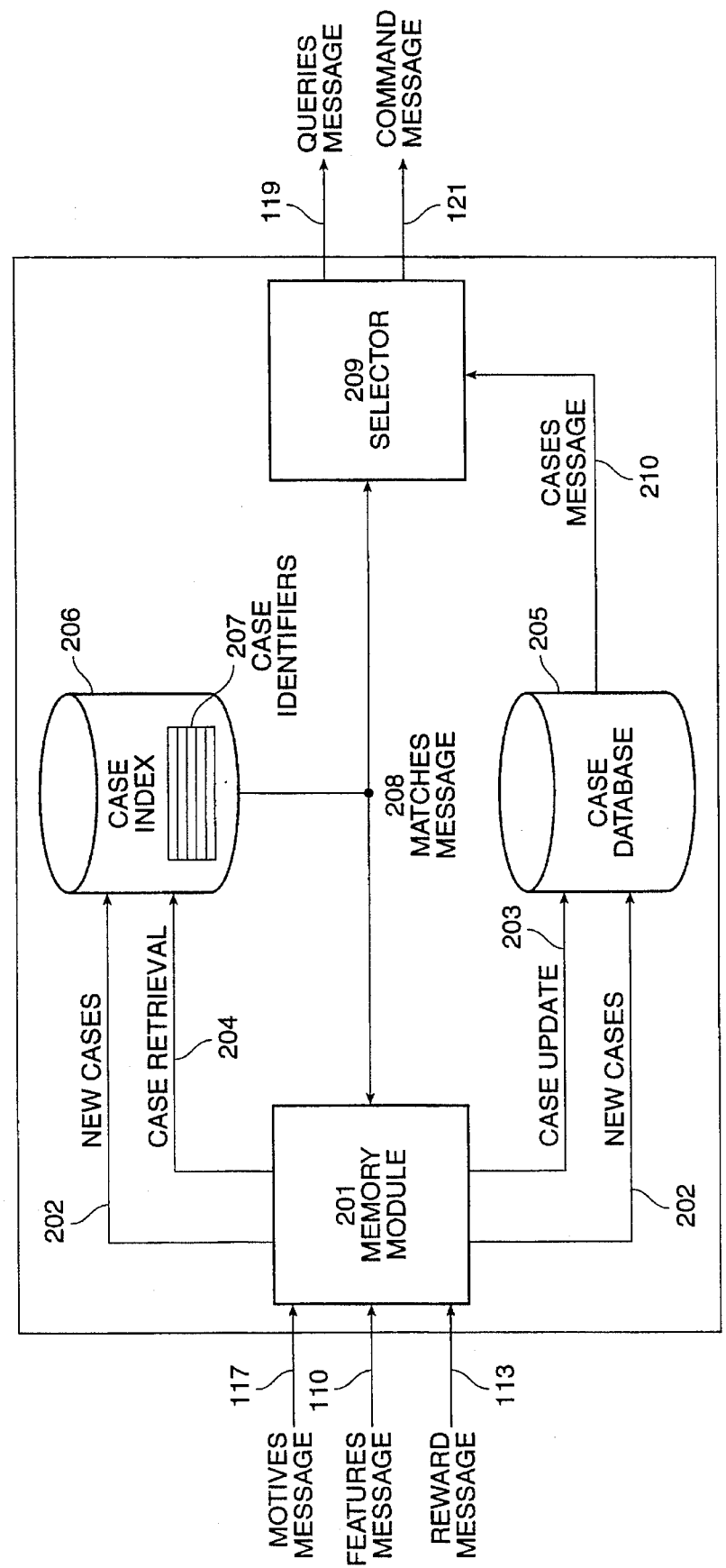
FIG. 2 shows a block diagram of a behavior module of an autonomous agent.

FIG. 2 shows a block diagram of a behavior module of an autonomous agent.

A memory module 201 may receive the motives message 117, the features message 110 and the reward message 113, and may generate a set of new cases 202, a set of case update messages 203, and a set of case retrieval messages 204. The new cases 202 may be transmitted to a case database 205 for storage, and to a case index 206 for indexing. In a preferred embodiment, aspects of a case-based reasoning system like that disclosed in parent copending application, Ser. No. 07/664,561, filed Mar. 4, 1991, consistent with the functions disclosed herein, may be used for case indexing and matching. The case database 205 may store the actual cases 126; the case index 206 may comprise a mapping from the features 111 to the cases 126 themselves.

Figure 3:
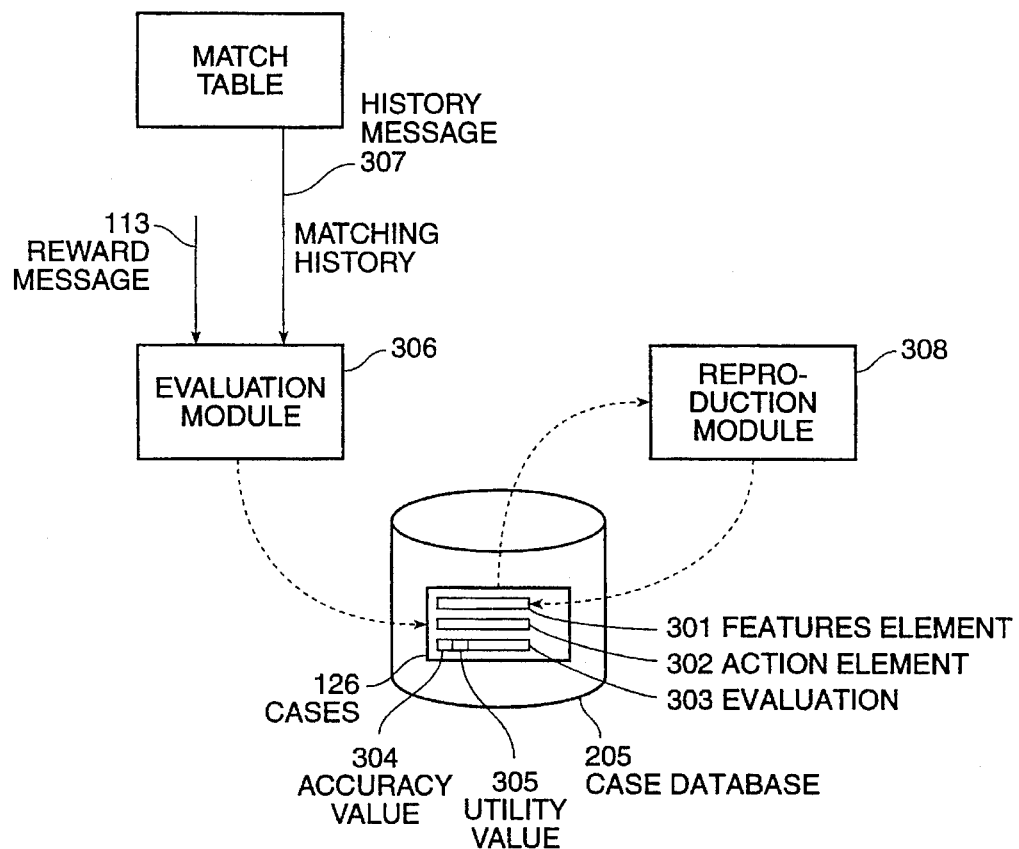
FIG. 3 shows a data flow diagram of a genetic technique for producing, evaluating and selecting cases.

In a preferred embodiment, the case database 205 may comprise a limited number of stored cases 126, the contents of the case database 205 being determined by a genetic technique for producing, evaluating and selecting the cases 126, such as a genetic technique like that disclosed with FIG. 3. Thus, while the case database 205 might store less than all of the cases 126 which the autonomous agent 101 has encountered, it might maintain a set of cases 126 which provides a preferred model of the environment, such as those cases 126 which allow the agent 101 to distinguish variant problem scenarios and to act autonomously and intelligently in those variant problem scenarios.

The case index 206 may comprise an index of the cases stored in the case database 205 (e.g., a set of case identifiers 207), organized so that cases 126 may be matched and retrieved, and may respond to the case retrieval message 204 by providing a matches message 208. The matches message 208 may comprise the case identifiers 207, and other information which a selector 209 may require.

The selector 209 may receive the matches message 208 and may also receive a cases message 210 from the case database 205, and may generate the queries message 119 and the commands message 121. In a preferred embodiment, the selector 209 may employ a technique for selecting cases like that disclosed with FIG. 4. The cases message 210 may comprise data from the cases 126, including evaluation data such as accuracy and utility values.

FIG. 3 shows a data flow diagram of a genetic technique for producing, evaluating and selecting cases.

The case database 205 may comprise its current set of cases 126, each of which may comprise a features element 301, which may generally indicate when the case 126 may be useful, and an action element 302, which may indicate the action 105 to take and an evaluation 303 of that action 105. In a preferred embodiment, the evaluation 303 may comprise an accuracy value 304, which may indicate how "good" the case 126 generally is when used, and a utility value 305, which may indicate how "often" the case 126 generally is usable. For example, if the environment 102 is a carpenter's bench, the utility value 305 of a hammer may be high, because it is often usable, even though its accuracy value 304 indicates that, even when the hammer is usable, it is not always the best choice. Similarly, the utility value 305 of a plane may be low, because it is only used in specialized situations, even though its accuracy value 304 indicates that whenever it is usable, it is the correct tool to choose.

An evaluation module 306 may receive the reward message 113 and a history message 307 (indicating the history of matches), and may operate on the cases 126 to adjust their evaluations 303, particularly their accuracy values 304 and their utility values 305. The evaluation module 306 may respond to the reward message 113 by altering the utility values 305 of the cases 126 to "reinforce" those cases 126 which correspond to the action which resulted in the reinforcement 114. Thus, rewards are "credited" to the cases 126 which earned them. Moreover, the evaluation module 306 may also alter the utility values 305 of those cases 126 which correspond to the action just previous to the reinforced action as well. Thus, rewards are also credited to the cases 126 which "led up to" them.

In a preferred embodiment, the evaluation module 306 may alter the utility value 305 of each case 126 by adding the reinforcement 114 and the utility value 305 of the case 126 which is the "best match" for the next action. Thus:

utility value (time t)=reinforcement+utility value (time t+1)

A reproduction module 308 may operate on the cases 126 to adjust their features elements 301 or the action 105 in their action elements 302, by one or more of several techniques. For example, the reproduction module 308 may create and delete cases 126. The reproduction module 308 may create cases 126, for example by inserting new cases 126 into the case database 205 as they are encountered. One method for such instance-based learning is disclosed in parent copending application, Ser. No. 07/664,561, filed Mar. 4, 1991. The reproduction module 308 may delete cases 126, for example when their accuracy values 304 or their utility values 305 fall below a threshold.

The reproduction module 308 may also make new cases 126 from the old cases 126 in the case database 205. The reproduction module 308 may mutate cases 126, for example by altering one or more features 111 in one case 126 in the case database 205. The reproduction module 308 may also cross-pollinate cases 126, for example by selecting some features 111 from one old case 126 and some features 111 from another old case 126 to create one or more new cases 126.

The operation of the evaluation module 306 and the reproduction module 308 serve to continually review and update the selection of cases 126 in the case database 205, so that the case database 205 is continually altered into a progressively better set of cases 126. The genetic technique is influenced by the reward message 113, which provides a form of evolutionary pressure towards selection of those sets of cases 126 in the case database 205 which maximize rewards.

Figure 4:
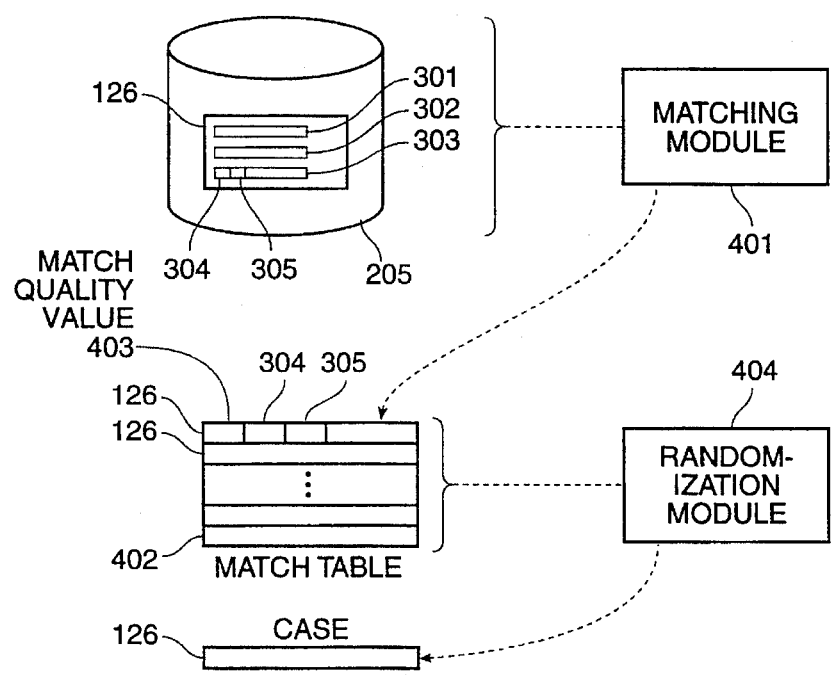
FIG. 4 shows a data flow diagram of a technique for selecting cases in a memory.

FIG. 4 shows a data flow diagram of a technique for selecting cases in a memory.

A matching module 401 may review the cases 126 in the case database 205 and may generate a match table 402. In a preferred embodiment, a technique for selecting cases 126 may employ techniques for matching features 111 such as attribute-value pairs, and for generating the match table 402, like those disclosed in parent copending application, Ser. No. 07/664,561, filed Mar. 4, 1991, consistent with the functions disclosed herein. The match table 402 may comprise a set of cases 126 (or indices of cases 126), each having a match quality value 403, the accuracy value 304 of that case 126, and the utility value 305 of that case 126.

A randomization module 404 may choose one of the cases 126 based on a random or pseudorandom effect. As used herein, "random" effects include pseudorandom effects and related methods which may be used to achieve similar results. In a preferred embodiment, the randomization module 404 may choose one of the cases 126 in the match table 402 with a probability of choice for each case 126 which is linearly proportional to its accuracy value 304. The cases 126 in the match table 402 are therefore chosen for matching based on their match quality values 403, but they are selected for action based on their accuracy values 304. This allows the technique for selection to encourage experimentation by the agent 101.

It would be clear to one of ordinary skill in the art, after perusal of the specification, drawings and claims herein, that the randomization module 404 may employ other and further techniques for choosing one of the cases 126 in the match table 402. For example, another measure associated with the cases 126 (such as their utility value 305), or a combination of values associated with the cases 126 might be employed in place of the accuracy value 304. Moreover, the probability of choice may be other than linearly proportional to the accuracy value 304. It would be clear to one of ordinary skill in the art that such other and further techniques would be workable, and are within the scope and spirit of the invention.

FIG. 5 shows a block diagram of an intelligent office equipment device including an autonomous agent.

A device 501, such as a photocopier or printer, may be coupled to a device driver interface 502, which may be coupled to a control processor 503 including the autonomous agent 101. The device 501 may of course be one of many different devices, such as a fax machine, a modem, or a telephone.

The device driver interface 502 provides the stimulus message 104 to the control processor 503, which delivers the stimulus message 104 to the autonomous agent 101. The autonomous agent 101 generates the action message 106, which the control processor 503 delivers to the device driver interface 502.

The motives message 117 may reflect a set of goals, such as eliminating or reducing the need for user involvement in maintenance of the device 501, and to anticipate failures of the device 501 so that preventative maintenance may be performed so as to reduce failures and to increase mean-time-between-failure. The features message 110 may comprise sensor readings from the device 501, and commands from users and dealers. The action message 106 may comprise orders to the device driver interface 502 to alter settings on the device 501, and may also comprise messages to users and dealers such as diagnostic and repair messages. The reward message 113 may comprise a negative reinforcement 114 whenever the device 501 fails.

FIG. 6 shows a block diagram of a customer service system with a help-desk system including an autonomous agent.

A user 601, such as a human being, may access the system by means of a telephone connection 602. A help-desk system 603 may attempt to respond to inquiries and resolve problems, with the aid of the autonomous agent 101. The help-desk system 603 provides the stimulus message 104 to the autonomous agent 101. The autonomous agent 101 generates the action message 106 for the help-desk system 603.

The help-desk system 603, its purpose and operation, may be like that shown in parent copending application, Ser. No. 07/664,561, filed Mar. 4, 1991. It may receive touch-tone commands from the user 601 and may generate voice messages by means of voice response units; receiving touch-tone commands and generating voice messages are well known in the art.

The motives message 117 may reflect a set of goals, such as responding to user inquiries with appropriate information and properly resolving user problems, so as to provide an intelligent help-desk system 603 which focuses on the user problem and responds to that problem, and which adapts to user behavior. The features message 110 may comprise touch-tone commands from the user 601, data indicating voice response unit messages given to the user 601, and state information about the telephone connection 602. The action message 106 may comprise commands to the help-desk system 603 or commands to a telephone system 604 controlling the telephone connection 602 (e.g., to transfer the telephone connection 602 to a human operator).

The help-desk system 603 may consider that it has resolved the user problem when it reaches the end of its response or when it has transferred the telephone connection 602 to a human operator. The reward message 113 may comprise a positive reinforcement 114 when the help-desk system 603 resolves the user problem, and a negative reinforcement 114 whenever the telephone connection 602 is broken by the user 601 prior to that.

Figure 7:
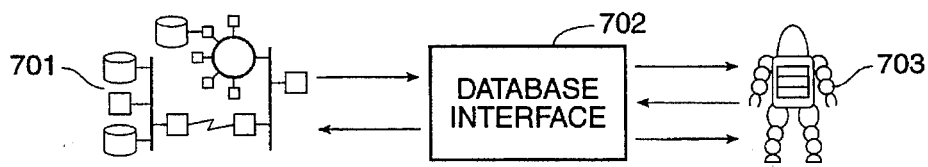
FIG. 7 shows a block diagram of a knowledge discovery system including an autonomous agent.

FIG. 7 shows a block diagram of a knowledge discovery system including an autonomous agent.

A knowledge database 701 may be coupled to a database interface 702, which may be coupled to a knowledge processor 703 including the autonomous agent 101. The knowledge database 701 may of course be one of many different types of databases, such as an object-oriented database or a relational database.

The database interface 702 provides the stimulus message 104 to the knowledge processor 703, which delivers the stimulus message 104 to the autonomous agent 101. The autonomous agent 101 generates the action message 106, which the knowledge processor 703 delivers to the database interface 702.

The motives message 117 may reflect a set of goals, such as discovering useful knowledge or patterns in the data in the knowledge database 701, so as to allow the autonomous agent 101 to generalize from data and to capture useful statements about regularities in the knowledge database 701. The features message 110 may comprise statements about data in the knowledge database 701, such as schema definitions or database tables. The action message 106 may comprise orders to the database interface 702 to alter or interrogate the knowledge database 701, such as database queries and transactions. The reward message 113 may comprise a positive reinforcement 114 whenever the autonomous agent 101 discovers "useful" information, for some predetermined definition of "useful" (e.g., an approval message from a human operator).

Appendix A shows an example software environment and autonomous agent for distinguishing between classes of irises. The example software environment comprises a "trainer" for the autonomous agent 101 which determines when the autonomous agent 101 has made a correct determination and provides an appropriate reward message 113. Some exemplary data statements are also included.

Alternative Embodiments

While preferred embodiments are disclosed herein, many variations are possible which remain within the concept and scope of the invention, and these variations would become clear to one of ordinary skill in the art after perusal of the specification, drawings and claims herein.

```
;;;
;;; ART-IM Autonomous Agent
;;;
;;; Version 0.5
;;; By Bradley P. Allen
;;;
;;; Inference Corporation Proprietary and Confidential
;;;

;;; AGENTS class (defschema agents
  (is-a case-bases)
  (number-of-cases)
  (previous-cases)
  (reinforcement-signal 0)
  (situation)
  (action-set)
  (number-of-cases 0)
  (total-cases-created 0)
  (max-number-of-cases 1000)
  (number-of-situations 0)
  (case-file "AGENT.CBR")
  (initialize agent-initialize)
  (stimulate agent-stimulate)
  (react agent-react)
  (create agent-create)
  (generalize-example agent-generalize-example)
  (random-action agent-random-action))

(def-art-fun agent-initialize (?agent)
  (send init ?agent)
  (bind ?file (get-schema-value ?agent case-file))
  (system (sprintf "rm %a" ?file))
  (send set ?agent :file ?file)
  (send read ?agent)
  (send set ?agent :max-matches 5)
  (send set ?agent :default-match-type :ignore)
  (send set ?agent :key id)
  (send set ?agent :absence-weight -10)
  (send set ?agent :threshold 0.5)
  (for ?feature in-schema-has-instances-of features do
       (send add ?feature ?agent))
  (modify-schema-value ?agent action-set
       (for ?a in-schema-has-instances-of actions collect$ ?a))
  (modify-schema-value ?agent number-of-cases 0)
  (modify-schema-value ?agent total-cases-created 0)
  (modify-schema-value ?agent number-of-situations 0))

(def-art-fun agent-stimulate (?agent ?feature ?value)
  (bind ?situation (get-schema-value ?agent situation))
  (if (not (slotp ?situation ?feature)) then
      (slotc ?situation ?feature))
  (modify-schema-value ?situation ?feature ?value))

(def-art-fun agent-react (?agent)
  (bind ?situation (get-schema-value ?agent situation))
  (bind ?nsituations (get-schema-value ?agent number-of-situations))
  (modify-schema-value ?agent number-of-situations (+ ?nsituations 1))
  ;(printout t t "****************************" t)
```

```
;(send display-matches ?agent ?situation)
(bind ?nmatches (send match ?agent ?situation))
(if (> ?nmatches 0) then
    (bind ?matches
        (create$
            (string-to-symbol
                (sprintf "CASE%d"
                    (send retrieve-match ?agent 1)))))
    (if (> ?nmatches 1) then
        (bind ?strength (send retrieve-match-score ?agent 1))
        (bind ?i 2)
        (while (and (<= ?i ?nmatches)
                    (= (send retrieve-match-score ?agent ?i) ?strength)) do
            (bind ?matches
                (insert$
                    (string-to-symbol
                        (sprintf "CASE%d"
                            (send retrieve-match ?agent ?i)))
                    ?matches))
            (bind ?i (+ ?i 1))))
    (bind ?max-accuracy -1)
    (for ?match in$ ?matches do
        ;(printout t t "Match " ?match "..." t)
        ;(ppschema ?match)
        (bind ?a (get-schema-value ?match accuracy))
        (if (> ?a ?max-accuracy) then
            (bind ?max-accuracy ?a)
            (bind ?best-case ?match)))
    ;(printout t "Best match: " ?best-case)
    (bind ?correct-action (get-schema-value ?situation action))
    (bind ?best-action (get-schema-value ?best-case action))
    (send execute ?best-action)
    (if ?correct-action then
        (bind ?i 1)
        (for ?match in$ ?matches do
            (if (schemap ?match) then
                (bind ?match-action (get-schema-value ?match action))
                (if (equal ?match-action ?correct-action) then
;                   (printout t t "Match " ?match " is being rewarded...")
                    (send update ?match ?agent ?i t)
                    else
;                   (printout t t "Match " ?match " is being punished...")
                    (send update ?match ?agent ?i nil)))
            ;(ppschema ?match)
            (bind ?i (+ ?i 1)))
        (if (not (equal ?best-action ?correct-action)) then
            (send create ?agent)))
    else
        (send create ?agent))
;   (for ?feature in-schema-has-instances-of features do
;       (send modify ?feature ?agent))
)

(def-art-fun agent-create (?agent)
    (bind ?nsituations (get-schema-value ?agent number-of-situations))
    (bind ?number-of-cases (get-schema-value ?agent number-of-cases))
    (bind ?cases-created (+ (get-schema-value ?agent total-cases-created) 1))
    (modify-schema-value ?agent total-cases-created ?cases-created)
    (if (< ?number-of-cases (get-schema-value ?agent max-number-of-cases)) then
        (bind ?number-of-cases (+ ?number-of-cases 1))
```

```
      (modify-schema-value ?agent number-of-cases ?number-of-cases)
      else
      (bind ?min-utility 1.1)
      (for ?case in-schema-has-instances-of exemplars do
            (bind ?u (/ (get-schema-value ?case number-of-correct-matches)
                        ?nsituations))
            (if (< ?u ?min-utility) then
                 (bind ?min-utility ?u)
                 (bind ?most-useless-case ?case)))
      (send delete ?agent ?most-useless-case)
      (schemad ?most-useless-case))
   (send generalize-example ?agent))

(def-art-fun agent-generalize-example (?agent)
   (bind ?situation (get-schema-value ?agent situation))
   (bind ?nsituations (get-schema-value ?agent number-of-situations))
   (bind ?correct-action (get-schema-value ?situation action))
   (bind ?nsituations (get-schema-value ?agent number-of-situations))
   (bind ?number-of-cases (get-schema-value ?agent number-of-cases))
   (bind ?cases-created (+ (get-schema-value ?agent total-cases-created) 1))
   (bind ?new-case (string-to-symbol (sprintf "CASE%d" ?cases-created)))
   (if (schemap ?new-case) then (schemad ?new-case))
   (schemac ?new-case)
   (slotc ?new-case instance-of)
   (put-schema-value ?new-case instance-of exemplars)
   (if ?correct-action then
         (put-schema-value ?new-case action ?correct-action)
         else
         (put-schema-value ?new-case action (send random-action ?agent)))
   (for ?slot in-slots-of ?situation do
         (if (and (not (equal ?slot instance-of))
                  (not (equal ?slot action))) then
               (slotc ?new-case ?slot)
               (for ?value in-slot-values-of ?situation ?slot do
                     (put-schema-value ?new-case ?slot ?value))))
   (modify-schema-value ?new-case id ?cases-created)
   (send add ?agent ?new-case)
   ?new-case)

(def-art-fun agent-random-action (?agent)
   (bind ?actions (get-schema-value ?agent action-set))
   (nth$ ?actions (+ 1 (random (length$ ?actions)))))

(def-art-fun agent-reinforce (?agent ?reinforcement)
   (modify-schema-value ?agent reinforcement-signal ?reinforcement))

;;;
;;; CASES class
;;;

(defschema cases
   (action))

(defschema exemplars
   (is-a cases)
   (id)
   (number-of-matches 2)
   (number-of-correct-matches 2)
   (accuracy 1.0)
   (update case-update))
```

```
(def-art-fun case-update (case ?agent ?position ?correct
    (bind ?nsituations (get-schema-value ?agent number-of-situations))
    (bind ?nmatches (+ (get-schema-value ?case number-of-matches) 1))
    (bind ?ncorrect (get-schema-value ?case number-of-correct-matches))
    (modify-schema-value ?case number-of-matches ?nmatches)
    (if ?correct then
        (bind ?ncorrect (+ ?ncorrect 1))
        (modify-schema-value ?case number-of-correct-matches ?ncorrect))
    (modify-schema-value
        ?case accuracy (/ (float ?ncorrect) (float ?nmatches)))
;   (for ?slot in-slots-of ?case do
;       (if (and (not (equal ?slot instance-of))
;                (not (equal ?slot action))) then
;           (bind ?feature (string-to-symbol (sprintf "%a-FEATURE" ?slot)))
;           (bind ?score (send retrieve-slot-score ?agent ?slot ?position))
;           (if (and (> ?score 0.0) ?correct) then
;               (send update ?feature ?agent t t))
;           (if (and (> ?score 0.0) (not ?correct)) then
;               (send update ?feature ?agent nil t))
;           (if (and (< ?score 0.0) ?correct) then
;               (send update ?feature ?agent t nil))
;           (if (and (< ?score 0.0) (not ?correct)) then
;               (send update ?feature ?agent nil nil))))
)

;;;
;;; FEATURES class
;;;

(defschema features
    (name)
    (match-type)
    (match-weight 1)
    (mismatch-weight 1)
    (confirming-positive 10)
    (infirming-positive 10)
    (confirming-negative 10)
    (infirming-negative 10)
    (logical-sufficiency 0)
    (logical-necessity 0)
    (add feature-add)
    (initialize feature-initialize)
    (modify feature-modify)
    (update feature-update))

(defschema string-features
    (is-a features)
    (match-type :string))

(defschema word-features
    (is-a features)
    (match-type :word))

(defschema character-features
    (is-a features)
    (match-type :character))

(defschema numeric-features
    (is-a features)
```

```
      (match-type :number)
      (minimum-value)
      (maximum-value)
      (match-deviation)
      (minimum-precision))

(def-art-fun feature-update (?feature ?agent ?confirming ?positive)
  (bind ?cp (get-schema-value ?feature confirming-positive))
  (bind ?cn (get-schema-value ?feature confirming-negative))
  (bind ?ip (get-schema-value ?feature infirming-positive))
  (bind ?in (get-schema-value ?feature infirming-negative))
  (if (and ?confirming ?positive) then
      (bind ?cp (+ ?cp 1))
      (modify-schema-value ?feature confirming-positive ?cp))
  (if (and ?confirming (not ?positive)) then
      (bind ?cn (+ ?cn 1))
      (modify-schema-value ?feature confirming-negative ?cn))
  (if (and (not ?confirming) ?positive) then
      (bind ?ip (+ ?ip 1))
      (modify-schema-value ?feature infirming-positive ?ip))
  (if (and (not ?confirming) (not ?positive)) then
      (bind ?in (+ ?in 1))
      (modify-schema-value ?feature infirming-negative ?in))
  (bind ?ls (/ (* (float ?cp) (+ (float ?in) (float ?cn)))
               (* (float ?in) (+ (float ?cp) (float ?ip)))))
  (bind ?ln (/ (* (float ?ip) (+ (float ?in) (float ?cn)))
               (* (float ?cn) (+ (float ?cp) (float ?ip)))))
  (modify-schema-value ?feature logical-sufficiency ?ls)
  (modify-schema-value ?feature logical-necessity ?ln)
  (modify-schema-value ?feature match-weight (min 120 (ceiling ?ls)))
  (modify-schema-value ?feature mismatch-weight (min 120 (ceiling ?ln))))

(def-art-fun feature-add (?feature ?agent)
  (if (instance-of-p ?feature numeric-features) then
      (send add ?agent :slot
                  (get-schema-value ?feature name)
                  :number
                  (get-schema-value ?feature match-weight)
                  (get-schema-value ?feature mismatch-weight)
                  (get-schema-value ?feature minimum-value)
                  (get-schema-value ?feature maximum-value)
                  (get-schema-value ?feature match-deviation)
                  (get-schema-value ?feature minimum-precision))
      else
      (send add ?agent :slot
                  (get-schema-value ?feature name)
                  (get-schema-value ?feature match-type)
                  (get-schema-value ?feature match-weight)
                  (get-schema-value ?feature mismatch-weight))))

(def-art-fun feature-modify (?feature ?agent)
  (if (instance-of-p ?feature numeric-features) then
      (send modify ?agent :slot
                  (get-schema-value ?feature name)
                  :number
                  (get-schema-value ?feature match-weight)
                  (get-schema-value ?feature mismatch-weight)
                  (get-schema-value ?feature minimum-value)
                  (get-schema-value ?feature maximum-value)
                  (get-schema-value ?feature match-deviation)
```

```
                         (get-schema-value ?feature minimum-precision))
        else
        (send modify ?agent :slot
                  (get-schema-value ?feature name)
                  (get-schema-value ?feature match-type)
                  (get-schema-value ?feature match-weight)
                  (get-schema-value ?feature mismatch-weight))))

;;;
;;; ACTIONS class and subclasses
;;;
;;;                                      |-GET-REMOTE-ACTIONS
;;;                                      |
;;;           |-WINDOWS-30-ACTIONS-|-SET-REMOTE-ACTIONS
;;;           |                          |
;;;           |                          |-EXECUTE-REMOTE-ACTIONS
;;;           |
;;; ACTIONS- |-ART-IM_ACTIONS-|-SEND-ACTIONS
;;;           |
;;;           |-UNIX-ACTIONS-|-SYSTEM-ACTIONS
;;;           |
;;;           |-NO-OP-ACTIONS
;;;

(defschema actions
  (agent)
  (object)
  (value))

#+WINDOWS
(defschema windows-30-actions
  (is-a actions))

#+WINDOWS
(defschema set-remote-actions
  (is-a windows-30-actions)
  (item)
  (value)
  (execute set-remote-action-execute))

#+WINDOWS
(def-art-fun set-remote-action-execute (?action)
  (bind ?item (get-schema-value ?action item))
  (bind ?value (get-schema-value ?action value))
  (bind ?object (get-schema-value ?action object))
  (bind ?value (get-schema-value ?action value))
  (set-remote ?item ?value ?object ?value))

#+WINDOWS
(defschema get-remote-actions
  (is-a windows-30-actions)
  (item)
  (feature)
  (execute get-remote-action-execute))

#+WINDOWS
(def-art-fun get-remote-action-execute (?action)
  (bind ?item (get-schema-value ?action item))
  (bind ?agent (get-schema-value ?action agent))
  (bind ?situation (get-schema-value ?agent situation))
```

```
    (bind ?feature (get-schema-value ?action feature))
    (bind ?object (get-sche  -value ?action object))
    (bind ?value (get-schema-value ?action value))
    (bind ?value (get-remote ?item ?object ?value))
    (send stimulate ?agent ?feature ?value))

#+WINDOWS
(defschema execute-remote-actions
   (is-a windows-30-actions)
   (command)
   (execute execute-remote-action-execute))

#+WINDOWS
(def-art-fun execute-remote-action-execute (?action)
   (bind ?command (get-schema-value ?action command))
   (bind ?object (get-schema-value ?action object))
   (bind ?value (get-schema-value ?action value))
   (execute-remote ?command ?object ?value))

(defschema art-im-actions
   (is-a actions))

(defschema send-actions
   (is-a art-im-actions)
   (message)
   (execute send-action-execute))

(def-art-fun send-action-execute (?action)
   (bind ?message (get-schema-value ?action message))
   (bind ?object (get-schema-value ?action object))
   (bind ?value (get-schema-value ?action value))
   (send ?message ?object ?value))

#+UNIX
(defschema unix-actions
   (is-a actions))

#+UNIX
(defschema system-actions
   (is-a unix-actions)
   (command)
   (execute system-action-execute))

#+UNIX
(def-art-fun system-action-execute (?action)
   (bind ?command (get-schema-value ?action command))
   (system ?command))

(defschema no-op-actions
   (is-a actions)
   (execute no-op-action-execute))

(def-art-fun no-op-action-execute (?action)
   no-op)
```

```
(defschema trainers
  (training-class)
  (training-instances)
  (test-instances)
  (agent-response)
  (initialize trainer-initialize)
  (accept-response trainer-accept-response)
  (train trainer-train)
  (test trainer-test)
  (cross-validate trainer-cross-validate))

(def-art-fun trainer-initialize (?trainer)
  (bind ?class (get-schema-value ?trainer training-class))
  (bind ?training-set (create$))
  (bind ?test-set (create$))
  (bind ?randomized-instances (create$))
  (bind ?instances (for ?s in-schema-has-instances-of ?class collect$ ?s))
  (bind ?ninstances (length$ ?instances))
  (while (> (length$ ?instances) 0) do
      (bind ?n (+ (random (length$ ?instances)) 1))
      (bind ?instancen (nth$ ?instances ?n))
      (bind ?randomized-instances (insert$ ?instancen ?randomized-instances))
      (bind ?instances (remove$ ?instancen ?instances)))
  (for ?i from 1 to ?ninstances do
      (bind ?s (nth$ ?randomized-instances ?i))
      (if (< ?i (ceiling (* 0.9 ?ninstances))) then
          (bind ?training-set (insert$ ?s ?training-set))
          else
          (bind ?test-set (insert$ ?s ?test-set))))
  (modify-schema-value ?trainer test-instances ?test-set)
  (modify-schema-value ?trainer training-instances ?training-set)
  t)

(def-art-fun trainer-accept-response (?trainer ?response)
  (modify-schema-value ?trainer agent-response ?response))

(def-art-fun trainer-train (?trainer ?agent ?iterations)
  (bind ?situation (get-schema-value ?agent situation))
  (bind ?training-set (get-schema-value ?trainer training-instances))
  (bind ?class (get-schema-value ?trainer training-class))
  (bind ?ncorrect 0)
  (bind ?ntrains (* (length$ ?training-set) ?iterations))
  (for ?i from 1 to ?iterations do
      (for ?instance in$ ?training-set do
          (modify-schema-value ?agent situation ?instance)
          ;(printout t t "Training on " ?instance "..." t)
          ;(ppschema ?instance)
          (modify-schema-value ?trainer agent-response no-response)
          (send react ?agent)
          (bind ?response (get-schema-value ?trainer agent-response))
          (if (equal ?response (get-schema-value ?instance action)) then
              (bind ?ncorrect (+ ?ncorrect 1)))))
  (/ (float ?ncorrect) (float ?ntrains)))

(def-art-fun trainer-test (?trainer ?agent)
  (bind ?situation (get-schema-value ?agent situation))
  (bind ?class (get-schema-value ?trainer training-class))
  (bind ?test-set (get-schema-value ?trainer test-instances))
  (bind ?ncorrect 0)
  (bind ?ntests (length$ ?test-set))
```

```
    (for ?instance in$ ?test-set do
        (modify-schema-value ?agent situation ?instance)
        (modify-schema-value ?trainer agent-response no-response)
        (send react ?agent)
        (bind ?response (get-schema-value ?trainer agent-response))
        (if (equal ?response (get-schema-value ?instance action)) then
            (bind ?ncorrect (+ ?ncorrect 1))))
    (/ (float ?ncorrect) (float ?ntests)))

(def-art-fun trainer-cross-validate (?trainer ?agent ?iterations)
    (bind ?rawcum 0.0)
    (printf ?*standard-output* "Running...\n")
    (for ?i from 1 to 10 do
        (send initialize ?trainer)
        (send initialize ?agent)
        (bind ?train (send train ?trainer ?agent ?iterations))
        (bind ?test (send test ?trainer ?agent))
        (bind ?cases (get-schema-value ?agent number-of-cases))
        (bind ?tcases (get-schema-value ?agent total-cases-created))
        (bind ?rawcum (+ ?rawcum ?test))
        (bind ?cum (/ ?rawcum ?i))
        (printf ?*standard-output* "\n%2d: train = %1.2f, saved =%5d, created =%5d,
        (for ?e in-schema-has-instances-of exemplars do
            (schemad ?e))
        (send terminate ?agent))
    (printf ?*standard-output* "\n\n")
    ?cum)
```

```
;;;+
;;; $Id: cb.art,v 1.6 90/12/01 13:05:50 auburn Exp Locker: carasso $
;;;-

(defschema cb-threshold (instance-of slot) (cardinality single))
(defschema cb-max-matches (instance-of slot) (cardinality single))
(defschema cb-key (instance-of slot) (cardinality single))
(defschema cb-file (instance-of slot) (cardinality single))
(defschema cb-storage-type (instance-of slot) (cardinality single))
(defschema cb-key-size (instance-of slot) (cardinality single))

(defschema cb-separators (instance-of slot) (cardinality multiple))
(defschema cb-ignored-words (instance-of slot) (cardinality multiple))

(defschema cb-synonyms (instance-of slot) (cardinality multiple))
(defschema cb-slot-synonyms (instance-of slot) (cardinality multiple))

(defschema cb-default-match-type     (instance-of slot) (cardinality single))
(defschema cb-absence-weight         (instance-of slot) (cardinality single))
(defschema cb-default-match-weight   (instance-of slot) (cardinality single))
(defschema cb-default-mismatch-weight (instance-of slot) (cardinality single))

(defschema cb-character-preprocessor (instance-of slot) (cardinality single))
(defschema cb-word-preprocessor      (instance-of slot) (cardinality single))
(defschema cb-string-preprocessor    (instance-of slot) (cardinality single))

(defschema cb-slots (instance-of slot) (cardinality multiple))
(defschema cb-number-points (instance-of slot) (cardinality multiple))

(defschema set (instance-of slot) (cardinality single))
(defschema get (instance-of slot) (cardinality single))

(defschema init (instance-of slot) (cardinality single))
(defschema terminate (instance-of slot) (cardinality single))

(defschema read (instance-of slot) (cardinality single))
(defschema write (instance-of slot) (cardinality single))

(defschema add (instance-of slot) (cardinality single))
(defschema modify (instance-of slot) (cardinality single))
(defschema delete (instance-of slot) (cardinality single))

(defschema match (instance-of slot) (cardinality single))
(defschema retrieve-match (instance-of slot) (cardinality single))
(defschema retrieve-match-score (instance-of slot) (cardinality single))
(defschema retrieve-slot-score (instance-of slot) (cardinality single))
(defschema finish-match (instance-of slot) (cardinality single))

(defschema display-matches (instance-of slot) (cardinality single))

(defschema case-bases
  (cb-threshold 0.0)
  (cb-max-matches 5)

(cb-key number-key)
  (cb-file "default.cbr")
  (cb-storage-type :compressed-hash)
  (cb-key-size)

(cb-absence-weight -1)
```

```
(cb-default-match-weight 10)
(cb-default-mismatch-weight -5)

(cb-character-preprocessor :default)
(cb-word-preprocessor      :default)
(cb-string-preprocessor    :default)

(cb-separators " " "\t" "\n" "\r" "(" ")" "-" "," ";" "=" ">" "<" "+" "/" "*"
(cb-ignored-words "A" "ABOUT" "AFTER" "ALL" "ALONG" "ALSO" "AN" "AND" "ANOTHER
 "BE" "BECAUSE" "BEEN" "BEFORE" "BEING" "BETWEEN" "BOTH" "BUT" "BY" "CAME"   "C
 "DID" "DO" "EACH" "FOR" "FROM" "GET" "GOT" "HAS" "HAD" "HAVE" "HE" "HER" "HER
 "HOW" "IF" "IN" "INTO" "IS" "IT" "ITS" "JUST" "LIKE" "MADE" "MANY" "ME" "MIGH
 "NEVER" "NOT" "NOW" "OF" "ON" "ONLY" "OR" "OTHER" "OUR" "OUT" "OVER" "SAID" "
 "SUCH" "TAKE" "THAN" "THAT" "THE" "THEIR" "THEM" "THEN" "THERE" "THESE" "THEY
 "UNDER" "UP" "USUALLY" "VERY" "WAS" "WAY" "WE" "WELL" "WERE" "WHAT" "WHEN" "W
 "WHILE" "WHO" "WITH" "WOULD" "YOU" "YOUR")

(cb-synonyms)
(cb-slot-synonyms)

(cb-default-match-type :string)
(cb-slots)
(cb-number-points)

;; Start of methods (set cb-set)
(get cb-get)

(init cb-init)
(terminate cb-terminate)

(read cb-read)
(write cb-write)

(add cb-add)
(modify' cb-modify)
(delete cb-delete)

(match cb-match)
(retrieve-match cb-retrieve-match)
(retrieve-match-score cb-retrieve-match-score)
(retrieve-slot-score cb-retrieve-slot-score)
(finish-match cb-finish-match)

(display-matches cb-display-matches))
```

```
;;;
;;; ART-IM Autonomous Agent Botanist
;;;
;;; By Bradley P. Allen
;;;
;;; Inference Corporation Proprietary and Confidential
;;;

;;;
;;; Agent
;;;

(defschema botanist
   (instance-of agents)
   (max-number-of-cases 100)
   (case-file "IRIS.CBR"))

;;;
;;; Features
;;;

(defschema petal-length-feature
   (instance-of numeric-features)
   (name petal-length)
   (match-type :number)
   (match-weight 1)
   (mismatch-weight 0)
   (minimum-value 0.0)
   (maximum-value 10.0)
   (match-deviation 1.0)
   (minimum-precision 0.1))

(defschema petal-width-feature
   (instance-of numeric-features)
   (name petal-width)
   (match-type :number)
   (match-weight 1)
   (mismatch-weight 0)
   (minimum-value 0.0)
   (maximum-value 10.0)
   (match-deviation 1.0)
   (minimum-precision 0.1))

(defschema sepal-length-feature
   (instance-of numeric-features)
   (name sepal-length)
   (match-type :number)
   (match-weight 1)
   (mismatch-weight 0)
   (minimum-value 0.0)
   (maximum-value 10.0)
   (match-deviation 1.0)
   (minimum-precision 0.1))

(defschema sepal-width-feature
   (instance-of numeric-features)
   (name sepal-width)
   (match-type :number)
   (match-weight 1)
   (mismatch-weight 0)
```

```
     (minimum-value 0.0)
     (maximum-value 10.0)
     (match-deviation 1.0)
     (minimum-precision 0.1))

;;;
;;; Actions
;;;

(defschema classify-as-iris-setosa
   (instance-of send-actions)
   (message accept-response)
   (object botany-trainer)
   (value classify-as-iris-setosa))

(defschema classify-as-iris-virginica
   (instance-of send-actions)
   (message accept-response)
   (object botany-trainer)
   (value classify-as-iris-virginica))

(defschema classify-as-iris-versicolor
   (instance-of send-actions)
   (message accept-response)
   (object botany-trainer)
   (value classify-as-iris-versicolor))

;;;
;;; Trainer
;;;

(defschema botany-trainer
   (instance-of trainers)
   (training-class iris-examples))

;;;
;;; Iris examples
;;;

(defschema iris-examples
   (is-a cases))

(DEFSCHEMA INSTANCE1
   (INSTANCE-OF IRIS-EXAMPLES)
   (PETAL-LENGTH 1.4)
   (PETAL-WIDTH 0.2)
   (SEPAL-LENGTH 5.1)
   (SEPAL-WIDTH 3.5)
   (ACTION CLASSIFY-AS-IRIS-SETOSA))

(DEFSCHEMA INSTANCE10
   (INSTANCE-OF IRIS-EXAMPLES)
   (PETAL-LENGTH 1.5)
   (PETAL-WIDTH 0.1)
   (SEPAL-LENGTH 4.9)
   (SEPAL-WIDTH 3.1)
   (ACTION CLASSIFY-AS-IRIS-SETOSA))

(DEFSCHEMA INSTANCE100
   (INSTANCE-OF IRIS-EXAMPLES)
```

```
    (PETAL-LENGTH 4.1)
    (PETAL-WIDTH 1.3)
    (SEPAL-LENGTH 5.7)
    (SEPAL-WIDTH 2.8)
    (ACTION CLASSIFY-AS-IRIS-VERSICOLOR))

(DEFSCHEMA INSTANCE101
    (INSTANCE-OF IRIS-EXAMPLES)
    (PETAL-LENGTH 6.0)
    (PETAL-WIDTH 2.5)
    (SEPAL-LENGTH 6.3)
    (SEPAL-WIDTH 3.3)
    (ACTION CLASSIFY-AS-IRIS-VIRGINICA))

(DEFSCHEMA INSTANCE102
    (INSTANCE-OF IRIS-EXAMPLES)
    (PETAL-LENGTH 5.1)
    (PETAL-WIDTH 1.9)
    (SEPAL-LENGTH 5.8)
    (SEPAL-WIDTH 2.7)
    (ACTION CLASSIFY-AS-IRIS-VIRGINICA))

(DEFSCHEMA INSTANCE103
    (INSTANCE-OF IRIS-EXAMPLES)
    (PETAL-LENGTH 5.9)
    (PETAL-WIDTH 2.1)
    (SEPAL-LENGTH 7.1)
    (SEPAL-WIDTH 3.0)
    (ACTION CLASSIFY-AS-IRIS-VIRGINICA))

(DEFSCHEMA INSTANCE104
    (INSTANCE-OF IRIS-EXAMPLES)
    (PETAL-LENGTH 5.6)
    (PETAL-WIDTH 1.8)
    (SEPAL-LENGTH 6.3)
    (SEPAL-WIDTH 2.9)
    (ACTION CLASSIFY-AS-IRIS-VIRGINICA))

(DEFSCHEMA INSTANCE105
    (INSTANCE-OF IRIS-EXAMPLES)
    (PETAL-LENGTH 5.8)
    (PETAL-WIDTH 2.2)
    (SEPAL-LENGTH 6.5)
    (SEPAL-WIDTH 3.0)
    (ACTION CLASSIFY-AS-IRIS-VIRGINICA))

(DEFSCHEMA INSTANCE106
    (INSTANCE-OF IRIS-EXAMPLES)
    (PETAL-LENGTH 6.6)
    (PETAL-WIDTH 2.1)
    (SEPAL-LENGTH 7.6)
    (SEPAL-WIDTH 3.0)
    (ACTION CLASSIFY-AS-IRIS-VIRGINICA))

(DEFSCHEMA INSTANCE107
    (INSTANCE-OF IRIS-EXAMPLES)
    (PETAL-LENGTH 4.5)
    (PETAL-WIDTH 1.7)
    (SEPAL-LENGTH 4.9)
    (SEPAL-WIDTH 2.5)
```

```
    (ACTION CLASSIFY-AS-IRIS-VIRGINICA))

(DEFSCHEMA INSTANCE108
   (INSTANCE-OF IRIS-EXAMPLES)
   (PETAL-LENGTH 6.3)
   (PETAL-WIDTH 1.8)
   (SEPAL-LENGTH 7.3)
   (SEPAL-WIDTH 2.9)
   (ACTION CLASSIFY-AS-IRIS-VIRGINICA))

(DEFSCHEMA INSTANCE109
   (INSTANCE-OF IRIS-EXAMPLES)
   (PETAL-LENGTH 5.8)
   (PETAL-WIDTH 1.8)
   (SEPAL-LENGTH 6.7)
   (SEPAL-WIDTH 2.5)
   (ACTION CLASSIFY-AS-IRIS-VIRGINICA))

(DEFSCHEMA INSTANCE11
   (INSTANCE-OF IRIS-EXAMPLES)
   (PETAL-LENGTH 1.5)
   (PETAL-WIDTH 0.2)
   (SEPAL-LENGTH 5.4)
   (SEPAL-WIDTH 3.7)
   (ACTION CLASSIFY-AS-IRIS-SETOSA))

(DEFSCHEMA INSTANCE110
   (INSTANCE-OF IRIS-EXAMPLES)
   (PETAL-LENGTH 6.1)
   (PETAL-WIDTH 2.5)
   (SEPAL-LENGTH 7.2)
   (SEPAL-WIDTH 3.6)
   (ACTION CLASSIFY-AS-IRIS-VIRGINICA))

(DEFSCHEMA INSTANCE111
   (INSTANCE-OF IRIS-EXAMPLES)
   (PETAL-LENGTH 5.1)
   (PETAL-WIDTH 2.0)
   (SEPAL-LENGTH 6.5)
   (SEPAL-WIDTH 3.2)
   (ACTION CLASSIFY-AS-IRIS-VIRGINICA))

(DEFSCHEMA INSTANCE112
   (INSTANCE-OF IRIS-EXAMPLES)
   (PETAL-LENGTH 5.3)
   (PETAL-WIDTH 1.9)
   (SEPAL-LENGTH 6.4)
   (SEPAL-WIDTH 2.7)
   (ACTION CLASSIFY-AS-IRIS-VIRGINICA))

(DEFSCHEMA INSTANCE113
   (INSTANCE-OF IRIS-EXAMPLES)
   (PETAL-LENGTH 5.5)
   (PETAL-WIDTH 2.1)
   (SEPAL-LENGTH 6.8)
   (SEPAL-WIDTH 3.0)
   (ACTION CLASSIFY-AS-IRIS-VIRGINICA))

(DEFSCHEMA INSTANCE114
   (INSTANCE-OF IRIS-EXAMPLES)
```

```
    (PETAL-LENGTH 5.0)
    (PETAL-WIDTH 2.0)
    (SEPAL-LENGTH 5.7)
    (SEPAL-WIDTH 2.5)
    (ACTION CLASSIFY-AS-IRIS-VIRGINICA))

(DEFSCHEMA INSTANCE115
    (INSTANCE-OF IRIS-EXAMPLES)
    (PETAL-LENGTH 5.1)
    (PETAL-WIDTH 2.4)
    (SEPAL-LENGTH 5.8)
    (SEPAL-WIDTH 2.8)
    (ACTION CLASSIFY-AS-IRIS-VIRGINICA))

(DEFSCHEMA INSTANCE116
    (INSTANCE-OF IRIS-EXAMPLES)
    (PETAL-LENGTH 5.3)
    (PETAL-WIDTH 2.3)
    (SEPAL-LENGTH 6.4)
    (SEPAL-WIDTH 3.2)
    (ACTION CLASSIFY-AS-IRIS-VIRGINICA))

(DEFSCHEMA INSTANCE117
    (INSTANCE-OF IRIS-EXAMPLES)
    (PETAL-LENGTH 5.5)
    (PETAL-WIDTH 1.8)
    (SEPAL-LENGTH 6.5)
    (SEPAL-WIDTH 3.0)
    (ACTION CLASSIFY-AS-IRIS-VIRGINICA))

(DEFSCHEMA INSTANCE118
    (INSTANCE-OF IRIS-EXAMPLES)
    (PETAL-LENGTH 6.7)
    (PETAL-WIDTH 2.2)
    (SEPAL-LENGTH 7.7)
    (SEPAL-WIDTH 3.8)
    (ACTION CLASSIFY-AS-IRIS-VIRGINICA))

(DEFSCHEMA INSTANCE119
    (INSTANCE-OF IRIS-EXAMPLES)
    (PETAL-LENGTH 6.9)
    (PETAL-WIDTH 2.3)
    (SEPAL-LENGTH 7.7)
    (SEPAL-WIDTH 2.6)
    (ACTION CLASSIFY-AS-IRIS-VIRGINICA))

(DEFSCHEMA INSTANCE12
    (INSTANCE-OF IRIS-EXAMPLES)
    (PETAL-LENGTH 1.6)
    (PETAL-WIDTH 0.2)
    (SEPAL-LENGTH 4.8)
    (SEPAL-WIDTH 3.4)
    (ACTION CLASSIFY-AS-IRIS-SETOSA))

(DEFSCHEMA INSTANCE120
    (INSTANCE-OF IRIS-EXAMPLES)
    (PETAL-LENGTH 5.0)
    (PETAL-WIDTH 1.5)
    (SEPAL-LENGTH 6.0)
    (SEPAL-WIDTH 2.2)
```

```
        (ACTION CLASSIFY-AS-IRIS-VIRGINICA))

(DEFSCHEMA INSTANCE121
   (INSTANCE-OF IRIS-EXAMPLES)
   (PETAL-LENGTH 5.7)
   (PETAL-WIDTH 2.3)
   (SEPAL-LENGTH 6.9)
   (SEPAL-WIDTH 3.2)
   (ACTION CLASSIFY-AS-IRIS-VIRGINICA))

(DEFSCHEMA INSTANCE122
   (INSTANCE-OF IRIS-EXAMPLES)
   (PETAL-LENGTH 4.9)
   (PETAL-WIDTH 2.0)
   (SEPAL-LENGTH 5.6)
   (SEPAL-WIDTH 2.8)
   (ACTION CLASSIFY-AS-IRIS-VIRGINICA))

(DEFSCHEMA INSTANCE123
   (INSTANCE-OF IRIS-EXAMPLES)
   (PETAL-LENGTH 6.7)
   (PETAL-WIDTH 2.0)
   (SEPAL-LENGTH 7.7)
   (SEPAL-WIDTH 2.8)
   (ACTION CLASSIFY-AS-IRIS-VIRGINICA))

(DEFSCHEMA INSTANCE124
   (INSTANCE-OF IRIS-EXAMPLES)
   (PETAL-LENGTH 4.9)
   (PETAL-WIDTH 1.8)
   (SEPAL-LENGTH 6.3)
   (SEPAL-WIDTH 2.7)
   (ACTION CLASSIFY-AS-IRIS-VIRGINICA))

(DEFSCHEMA INSTANCE125
   (INSTANCE-OF IRIS-EXAMPLES)
   (PETAL-LENGTH 5.7)
   (PETAL-WIDTH 2.1)
   (SEPAL-LENGTH 6.7)
   (SEPAL-WIDTH 3.3)
   (ACTION CLASSIFY-AS-IRIS-VIRGINICA))

(DEFSCHEMA INSTANCE126
   (INSTANCE-OF IRIS-EXAMPLES)
   (PETAL-LENGTH 6.0)
   (PETAL-WIDTH 1.8)
   (SEPAL-LENGTH 7.2)
   (SEPAL-WIDTH 3.2)
   (ACTION CLASSIFY-AS-IRIS-VIRGINICA))

(DEFSCHEMA INSTANCE127
   (INSTANCE-OF IRIS-EXAMPLES)
   (PETAL-LENGTH 4.8)
   (PETAL-WIDTH 1.8)
   (SEPAL-LENGTH 6.2)
   (SEPAL-WIDTH 2.8)
   (ACTION CLASSIFY-AS-IRIS-VIRGINICA))

(DEFSCHEMA INSTANCE128
   (INSTANCE-OF IRIS-EXAMPLES)
```

```
    (PETAL-LENGTH 4.9)
    (PETAL-WIDTH 1.8)
    (SEPAL-LENGTH 6.1)
    (SEPAL-WIDTH 3.0)
    (ACTION CLASSIFY-AS-IRIS-VIRGINICA))

(DEFSCHEMA INSTANCE129
    (INSTANCE-OF IRIS-EXAMPLES)
    (PETAL-LENGTH 5.6)
    (PETAL-WIDTH 2.1)
    (SEPAL-LENGTH 6.4)
    (SEPAL-WIDTH 2.8)
    (ACTION CLASSIFY-AS-IRIS-VIRGINICA))

(DEFSCHEMA INSTANCE13
    (INSTANCE-OF IRIS-EXAMPLES)
    (PETAL-LENGTH 1.4)
    (PETAL-WIDTH 0.1)
    (SEPAL-LENGTH 4.8)
    (SEPAL-WIDTH 3.0)
    (ACTION CLASSIFY-AS-IRIS-SETOSA))

(DEFSCHEMA INSTANCE130
    (INSTANCE-OF IRIS-EXAMPLES)
    (PETAL-LENGTH 5.8)
    (PETAL-WIDTH 1.6)
    (SEPAL-LENGTH 7.2)
    (SEPAL-WIDTH 3.0)
    (ACTION CLASSIFY-AS-IRIS-VIRGINICA))

(DEFSCHEMA INSTANCE131
    (INSTANCE-OF IRIS-EXAMPLES)
    (PETAL-LENGTH 6.1)
    (PETAL-WIDTH 1.9)
    (SEPAL-LENGTH 7.4)
    (SEPAL-WIDTH 2.8)
    (ACTION CLASSIFY-AS-IRIS-VIRGINICA))

(DEFSCHEMA INSTANCE132
    (INSTANCE-OF IRIS-EXAMPLES)
    (PETAL-LENGTH 6.4)
    (PETAL-WIDTH 2.0)
    (SEPAL-LENGTH 7.9)
    (SEPAL-WIDTH 3.8)
    (ACTION CLASSIFY-AS-IRIS-VIRGINICA))

(DEFSCHEMA INSTANCE133
    (INSTANCE-OF IRIS-EXAMPLES)
    (PETAL-LENGTH 5.6)
    (PETAL-WIDTH 2.2)
    (SEPAL-LENGTH 6.4)
    (SEPAL-WIDTH 2.8)
    (ACTION CLASSIFY-AS-IRIS-VIRGINICA))

(DEFSCHEMA INSTANCE134
    (INSTANCE-OF IRIS-EXAMPLES)
    (PETAL-LENGTH 5.1)
    (PETAL-WIDTH 1.5)
    (SEPAL-LENGTH 6.3)
    (SEPAL-WIDTH 2.8)
```

```
      (ACTION CLASSIFY-AS-IRIS-VIRGINICA))

(DEFSCHEMA INSTANCE135
   (INSTANCE-OF IRIS-EXAMPLES)
   (PETAL-LENGTH 5.6)
   (PETAL-WIDTH 1.4)
   (SEPAL-LENGTH 6.1)
   (SEPAL-WIDTH 2.6)
   (ACTION CLASSIFY-AS-IRIS-VIRGINICA))

(DEFSCHEMA INSTANCE136
   (INSTANCE-OF IRIS-EXAMPLES)
   (PETAL-LENGTH 6.1)
   (PETAL-WIDTH 2.3)
   (SEPAL-LENGTH 7.7)
   (SEPAL-WIDTH 3.0)
   (ACTION CLASSIFY-AS-IRIS-VIRGINICA))

(DEFSCHEMA INSTANCE137
   (INSTANCE-OF IRIS-EXAMPLES)
   (PETAL-LENGTH 5.6)
   (PETAL-WIDTH 2.4)
   (SEPAL-LENGTH 6.3)
   (SEPAL-WIDTH 3.4)
   (ACTION CLASSIFY-AS-IRIS-VIRGINICA))

(DEFSCHEMA INSTANCE138
   (INSTANCE-OF IRIS-EXAMPLES)
   (PETAL-LENGTH 5.5)
   (PETAL-WIDTH 1.8)
   (SEPAL-LENGTH 6.4)
   (SEPAL-WIDTH 3.1)
   (ACTION CLASSIFY-AS-IRIS-VIRGINICA))

(DEFSCHEMA INSTANCE139
   (INSTANCE-OF IRIS-EXAMPLES)
   (PETAL-LENGTH 4.8)
   (PETAL-WIDTH 1.8)
   (SEPAL-LENGTH 6.0)
   (SEPAL-WIDTH 3.0)
   (ACTION CLASSIFY-AS-IRIS-VIRGINICA))

(DEFSCHEMA INSTANCE14
   (INSTANCE-OF IRIS-EXAMPLES)
   (PETAL-LENGTH 1.1)
   (PETAL-WIDTH 0.1)
   (SEPAL-LENGTH 4.3)
   (SEPAL-WIDTH 3.0)
   (ACTION CLASSIFY-AS-IRIS-SETOSA))

(DEFSCHEMA INSTANCE140
   (INSTANCE-OF IRIS-EXAMPLES)
   (PETAL-LENGTH 5.4)
   (PETAL-WIDTH 2.1)
   (SEPAL-LENGTH 6.9)
   (SEPAL-WIDTH 3.1)
   (ACTION CLASSIFY-AS-IRIS-VIRGINICA))

(DEFSCHEMA INSTANCE141
   (INSTANCE-OF IRIS-EXAMPLES)
```

```
    (PETAL-LENGTH 5.6)
    (PETAL-WIDTH 2.4)
    (SEPAL-LENGTH 6.7)
    (SEPAL-WIDTH 3.1)
    (ACTION CLASSIFY-AS-IRIS-VIRGINICA))

(DEFSCHEMA INSTANCE142
    (INSTANCE-OF IRIS-EXAMPLES)
    (PETAL-LENGTH 5.1)
    (PETAL-WIDTH 2.3)
    (SEPAL-LENGTH 6.9)
    (SEPAL-WIDTH 3.1)
    (ACTION CLASSIFY-AS-IRIS-VIRGINICA))

(DEFSCHEMA INSTANCE143
    (INSTANCE-OF IRIS-EXAMPLES)
    (PETAL-LENGTH 5.1)
    (PETAL-WIDTH 1.9)
    (SEPAL-LENGTH 5.8)
    (SEPAL-WIDTH 2.7)
    (ACTION CLASSIFY-AS-IRIS-VIRGINICA))

(DEFSCHEMA INSTANCE144
    (INSTANCE-OF IRIS-EXAMPLES)
    (PETAL-LENGTH 5.9)
    (PETAL-WIDTH 2.3)
    (SEPAL-LENGTH 6.8)
    (SEPAL-WIDTH 3.2)
    (ACTION CLASSIFY-AS-IRIS-VIRGINICA))

(DEFSCHEMA INSTANCE145
    (INSTANCE-OF IRIS-EXAMPLES)
    (PETAL-LENGTH 5.7)
    (PETAL-WIDTH 2.5)
    (SEPAL-LENGTH 6.7)
    (SEPAL-WIDTH 3.3)
    (ACTION CLASSIFY-AS-IRIS-VIRGINICA))

(DEFSCHEMA INSTANCE146
    (INSTANCE-OF IRIS-EXAMPLES)
    (PETAL-LENGTH 5.2)
    (PETAL-WIDTH 2.3)
    (SEPAL-LENGTH 6.7)
    (SEPAL-WIDTH 3.0)
    (ACTION CLASSIFY-AS-IRIS-VIRGINICA))

(DEFSCHEMA INSTANCE147
    (INSTANCE-OF IRIS-EXAMPLES)
    (PETAL-LENGTH 5.0)
    (PETAL-WIDTH 1.9)
    (SEPAL-LENGTH 6.3)
    (SEPAL-WIDTH 2.5)
    (ACTION CLASSIFY-AS-IRIS-VIRGINICA))

(DEFSCHEMA INSTANCE148
    (INSTANCE-OF IRIS-EXAMPLES)
    (PETAL-LENGTH 5.2)
    (PETAL-WIDTH 2.0)
    (SEPAL-LENGTH 6.5)
    (SEPAL-WIDTH 3.0)
```

```
        (ACTION CLASSIFY-AS-IRIS-VIRGINICA))

(DEFSCHEMA INSTANCE149
    (INSTANCE-OF IRIS-EXAMPLES)
    (PETAL-LENGTH 5.4)
    (PETAL-WIDTH 2.3)
    (SEPAL-LENGTH 6.2)
    (SEPAL-WIDTH 3.4)
    (ACTION CLASSIFY-AS-IRIS-VIRGINICA))

(DEFSCHEMA INSTANCE15
    (INSTANCE-OF IRIS-EXAMPLES)
    (PETAL-LENGTH 1.2)
    (PETAL-WIDTH 0.2)
    (SEPAL-LENGTH 5.8)
    (SEPAL-WIDTH 4.0)
    (ACTION CLASSIFY-AS-IRIS-SETOSA))

(DEFSCHEMA INSTANCE150
    (INSTANCE-OF IRIS-EXAMPLES)
    (PETAL-LENGTH 5.1)
    (PETAL-WIDTH 1.8)
    (SEPAL-LENGTH 5.9)
    (SEPAL-WIDTH 3.0)
    (ACTION CLASSIFY-AS-IRIS-VIRGINICA))

(DEFSCHEMA INSTANCE16
    (INSTANCE-OF IRIS-EXAMPLES)
    (PETAL-LENGTH 1.5)
    (PETAL-WIDTH 0.4)
    (SEPAL-LENGTH 5.7)
    (SEPAL-WIDTH 4.4)
    (ACTION CLASSIFY-AS-IRIS-SETOSA))

(DEFSCHEMA INSTANCE17
    (INSTANCE-OF IRIS-EXAMPLES)
    (PETAL-LENGTH 1.3)
    (PETAL-WIDTH 0.4)
    (SEPAL-LENGTH 5.4)
    (SEPAL-WIDTH 3.9)
    (ACTION CLASSIFY-AS-IRIS-SETOSA))

(DEFSCHEMA INSTANCE18
    (INSTANCE-OF IRIS-EXAMPLES)
    (PETAL-LENGTH 1.4)
    (PETAL-WIDTH 0.3)
    (SEPAL-LENGTH 5.1)
    (SEPAL-WIDTH 3.5)
    (ACTION CLASSIFY-AS-IRIS-SETOSA))

(DEFSCHEMA INSTANCE19
    (INSTANCE-OF IRIS-EXAMPLES)
    (PETAL-LENGTH 1.7)
    (PETAL-WIDTH 0.3)
    (SEPAL-LENGTH 5.7)
    (SEPAL-WIDTH 3.8)
    (ACTION CLASSIFY-AS-IRIS-SETOSA))

(DEFSCHEMA INSTANCE2
    (INSTANCE-OF IRIS-EXAMPLES)
```

```
        (PETAL-LENGTH 1.4)
        (PETAL-WIDTH 0.2)
        (SEPAL-LENGTH 4.9)
        (SEPAL-WIDTH 3.0)
        (ACTION CLASSIFY-AS-IRIS-SETOSA))

(DEFSCHEMA INSTANCE20
        (INSTANCE-OF IRIS-EXAMPLES)
        (PETAL-LENGTH 1.5)
        (PETAL-WIDTH 0.3)
        (SEPAL-LENGTH 5.1)
        (SEPAL-WIDTH 3.8)
        (ACTION CLASSIFY-AS-IRIS-SETOSA))

(DEFSCHEMA INSTANCE21
        (INSTANCE-OF IRIS-EXAMPLES)
        (PETAL-LENGTH 1.7)
        (PETAL-WIDTH 0.2)
        (SEPAL-LENGTH 5.4)
        (SEPAL-WIDTH 3.4)
        (ACTION CLASSIFY-AS-IRIS-SETOSA))

(DEFSCHEMA INSTANCE22
        (INSTANCE-OF IRIS-EXAMPLES)
        (PETAL-LENGTH 1.5)
        (PETAL-WIDTH 0.4)
        (SEPAL-LENGTH 5.1)
        (SEPAL-WIDTH 3.7)
        (ACTION CLASSIFY-AS-IRIS-SETOSA))

(DEFSCHEMA INSTANCE23
        (INSTANCE-OF IRIS-EXAMPLES)
        (PETAL-LENGTH 1.0)
        (PETAL-WIDTH 0.2)
        (SEPAL-LENGTH 4.6)
        (SEPAL-WIDTH 3.6)
        (ACTION CLASSIFY-AS-IRIS-SETOSA))

(DEFSCHEMA INSTANCE24
        (INSTANCE-OF IRIS-EXAMPLES)
        (PETAL-LENGTH 1.7)
        (PETAL-WIDTH 0.5)
        (SEPAL-LENGTH 5.1)
        (SEPAL-WIDTH 3.3)
        (ACTION CLASSIFY-AS-IRIS-SETOSA))

(DEFSCHEMA INSTANCE25
        (INSTANCE-OF IRIS-EXAMPLES)
        (PETAL-LENGTH 1.9)
        (PETAL-WIDTH 0.2)
        (SEPAL-LENGTH 4.8)
        (SEPAL-WIDTH 3.4)
        (ACTION CLASSIFY-AS-IRIS-SETOSA))

(DEFSCHEMA INSTANCE26
        (INSTANCE-OF IRIS-EXAMPLES)
        (PETAL-LENGTH 1.6)
        (PETAL-WIDTH 0.2)
        (SEPAL-LENGTH 5.0)
        (SEPAL-WIDTH 3.0)
```

```
    (ACTION CLASSIFY-AS-IRIS-SETOSA))

(DEFSCHEMA INSTANCE27
  (INSTANCE-OF IRIS-EXAMPLES)
  (PETAL-LENGTH 1.6)
  (PETAL-WIDTH 0.4)
  (SEPAL-LENGTH 5.0)
  (SEPAL-WIDTH 3.4)
  (ACTION CLASSIFY-AS-IRIS-SETOSA))

(DEFSCHEMA INSTANCE28
  (INSTANCE-OF IRIS-EXAMPLES)
  (PETAL-LENGTH 1.5)
  (PETAL-WIDTH 0.2)
  (SEPAL-LENGTH 5.2)
  (SEPAL-WIDTH 3.5)
  (ACTION CLASSIFY-AS-IRIS-SETOSA))

(DEFSCHEMA INSTANCE29
  (INSTANCE-OF IRIS-EXAMPLES)
  (PETAL-LENGTH 1.4)
  (PETAL-WIDTH 0.2)
  (SEPAL-LENGTH 5.2)
  (SEPAL-WIDTH 3.4)
  (ACTION CLASSIFY-AS-IRIS-SETOSA))

(DEFSCHEMA INSTANCE3
  (INSTANCE-OF IRIS-EXAMPLES)
  (PETAL-LENGTH 1.3)
  (PETAL-WIDTH 0.2)
  (SEPAL-LENGTH 4.7)
  (SEPAL-WIDTH 3.2)
  (ACTION CLASSIFY-AS-IRIS-SETOSA))

(DEFSCHEMA INSTANCE30
  (INSTANCE-OF IRIS-EXAMPLES)
  (PETAL-LENGTH 1.6)
  (PETAL-WIDTH 0.2)
  (SEPAL-LENGTH 4.7)
  (SEPAL-WIDTH 3.2)
  (ACTION CLASSIFY-AS-IRIS-SETOSA))

(DEFSCHEMA INSTANCE31
  (INSTANCE-OF IRIS-EXAMPLES)
  (PETAL-LENGTH 1.6)
  (PETAL-WIDTH 0.2)
  (SEPAL-LENGTH 4.8)
  (SEPAL-WIDTH 3.1)
  (ACTION CLASSIFY-AS-IRIS-SETOSA))

(DEFSCHEMA INSTANCE32
  (INSTANCE-OF IRIS-EXAMPLES)
  (PETAL-LENGTH 1.5)
  (PETAL-WIDTH 0.4)
  (SEPAL-LENGTH 5.4)
  (SEPAL-WIDTH 3.4)
  (ACTION CLASSIFY-AS-IRIS-SETOSA))

(DEFSCHEMA INSTANCE33
  (INSTANCE-OF IRIS-EXAMPLES)
```

```
    (PETAL-LENGTH 1.5)
    (PETAL-WIDTH 0.1)
    (SEPAL-LENGTH 5.2)
    (SEPAL-WIDTH 4.1)
    (ACTION CLASSIFY-AS-IRIS-SETOSA))

(DEFSCHEMA INSTANCE34
    (INSTANCE-OF IRIS-EXAMPLES)
    (PETAL-LENGTH 1.4)
    (PETAL-WIDTH 0.2)
    (SEPAL-LENGTH 5.5)
    (SEPAL-WIDTH 4.2)
    (ACTION CLASSIFY-AS-IRIS-SETOSA))

(DEFSCHEMA INSTANCE35
    (INSTANCE-OF IRIS-EXAMPLES)
    (PETAL-LENGTH 1.5)
    (PETAL-WIDTH 0.1)
    (SEPAL-LENGTH 4.9)
    (SEPAL-WIDTH 3.1)
    (ACTION CLASSIFY-AS-IRIS-SETOSA))

(DEFSCHEMA INSTANCE36
    (INSTANCE-OF IRIS-EXAMPLES)
    (PETAL-LENGTH 1.2)
    (PETAL-WIDTH 0.2)
    (SEPAL-LENGTH 5.0)
    (SEPAL-WIDTH 3.2)
    (ACTION CLASSIFY-AS-IRIS-SETOSA))

(DEFSCHEMA INSTANCE37
    (INSTANCE-OF IRIS-EXAMPLES)
    (PETAL-LENGTH 1.3)
    (PETAL-WIDTH 0.2)
    (SEPAL-LENGTH 5.5)
    (SEPAL-WIDTH 3.5)
    (ACTION CLASSIFY-AS-IRIS-SETOSA))

(DEFSCHEMA INSTANCE38
    (INSTANCE-OF IRIS-EXAMPLES)
    (PETAL-LENGTH 1.5)
    (PETAL-WIDTH 0.1)
    (SEPAL-LENGTH 4.9)
    (SEPAL-WIDTH 3.1)
    (ACTION CLASSIFY-AS-IRIS-SETOSA))

(DEFSCHEMA INSTANCE39
    (INSTANCE-OF IRIS-EXAMPLES)
    (PETAL-LENGTH 1.3)
    (PETAL-WIDTH 0.2)
    (SEPAL-LENGTH 4.4)
    (SEPAL-WIDTH 3.0)
    (ACTION CLASSIFY-AS-IRIS-SETOSA))

(DEFSCHEMA INSTANCE4
    (INSTANCE-OF IRIS-EXAMPLES)
    (PETAL-LENGTH 1.5)
    (PETAL-WIDTH 0.2)
    (SEPAL-LENGTH 4.6)
    (SEPAL-WIDTH 3.1)
```

```
    (ACTION CLASSIFY-AS-IRIS-SETOSA))

(DEFSCHEMA INSTANCE40
   (INSTANCE-OF IRIS-EXAMPLES)
   (PETAL-LENGTH 1.5)
   (PETAL-WIDTH 0.2)
   (SEPAL-LENGTH 5.1)
   (SEPAL-WIDTH 3.4)
   (ACTION CLASSIFY-AS-IRIS-SETOSA))

(DEFSCHEMA INSTANCE41
   (INSTANCE-OF IRIS-EXAMPLES)
   (PETAL-LENGTH 1.3)
   (PETAL-WIDTH 0.3)
   (SEPAL-LENGTH 5.0)
   (SEPAL-WIDTH 3.5)
   (ACTION CLASSIFY-AS-IRIS-SETOSA))

(DEFSCHEMA INSTANCE42
   (INSTANCE-OF IRIS-EXAMPLES)
   (PETAL-LENGTH 1.3)
   (PETAL-WIDTH 0.3)
   (SEPAL-LENGTH 4.5)
   (SEPAL-WIDTH 2.3)
   (ACTION CLASSIFY-AS-IRIS-SETOSA))

(DEFSCHEMA INSTANCE43
   (INSTANCE-OF IRIS-EXAMPLES)
   (PETAL-LENGTH 1.3)
   (PETAL-WIDTH 0.2)
   (SEPAL-LENGTH 4.4)
   (SEPAL-WIDTH 3.2)
   (ACTION CLASSIFY-AS-IRIS-SETOSA))

(DEFSCHEMA INSTANCE44
   (INSTANCE-OF IRIS-EXAMPLES)
   (PETAL-LENGTH 1.6)
   (PETAL-WIDTH 0.6)
   (SEPAL-LENGTH 5.0)
   (SEPAL-WIDTH 3.5)
   (ACTION CLASSIFY-AS-IRIS-SETOSA))

(DEFSCHEMA INSTANCE45
   (INSTANCE-OF IRIS-EXAMPLES)
   (PETAL-LENGTH 1.9)
   (PETAL-WIDTH 0.4)
   (SEPAL-LENGTH 5.1)
   (SEPAL-WIDTH 3.8)
   (ACTION CLASSIFY-AS-IRIS-SETOSA))

(DEFSCHEMA INSTANCE46
   (INSTANCE-OF IRIS-EXAMPLES)
   (PETAL-LENGTH 1.4)
   (PETAL-WIDTH 0.3)
   (SEPAL-LENGTH 4.8)
   (SEPAL-WIDTH 3.0)
   (ACTION CLASSIFY-AS-IRIS-SETOSA))

(DEFSCHEMA INSTANCE47
   (INSTANCE-OF IRIS-EXAMPLES)
```

```
    (PETAL-LENGTH 1.6)
    (PETAL-WIDTH 0.2)
    (SEPAL-LENGTH 5.1)
    (SEPAL-WIDTH 3.8)
    (ACTION CLASSIFY-AS-IRIS-SETOSA))

(DEFSCHEMA INSTANCE48
    (INSTANCE-OF IRIS-EXAMPLES)
    (PETAL-LENGTH 1.4)
    (PETAL-WIDTH 0.2)
    (SEPAL-LENGTH 4.6)
    (SEPAL-WIDTH 3.2)
    (ACTION CLASSIFY-AS-IRIS-SETOSA))

(DEFSCHEMA INSTANCE49
    (INSTANCE-OF IRIS-EXAMPLES)
    (PETAL-LENGTH 1.5)
    (PETAL-WIDTH 0.2)
    (SEPAL-LENGTH 5.3)
    (SEPAL-WIDTH 3.7)
    (ACTION CLASSIFY-AS-IRIS-SETOSA))

(DEFSCHEMA INSTANCE5
    (INSTANCE-OF IRIS-EXAMPLES)
    (PETAL-LENGTH 1.4)
    (PETAL-WIDTH 0.2)
    (SEPAL-LENGTH 5.0)
    (SEPAL-WIDTH 3.6)
    (ACTION CLASSIFY-AS-IRIS-SETOSA))

(DEFSCHEMA INSTANCE50
    (INSTANCE-OF IRIS-EXAMPLES)
    (PETAL-LENGTH 1.4)
    (PETAL-WIDTH 0.2)
    (SEPAL-LENGTH 5.0)
    (SEPAL-WIDTH 3.3)
    (ACTION CLASSIFY-AS-IRIS-SETOSA))

(DEFSCHEMA INSTANCE51
    (INSTANCE-OF IRIS-EXAMPLES)
    (PETAL-LENGTH 4.7)
    (PETAL-WIDTH 1.4)
    (SEPAL-LENGTH 7.0)
    (SEPAL-WIDTH 3.2)
    (ACTION CLASSIFY-AS-IRIS-VERSICOLOR))

(DEFSCHEMA INSTANCE52
    (INSTANCE-OF IRIS-EXAMPLES)
    (PETAL-LENGTH 4.5)
    (PETAL-WIDTH 1.5)
    (SEPAL-LENGTH 6.4)
    (SEPAL-WIDTH 3.2)
    (ACTION CLASSIFY-AS-IRIS-VERSICOLOR))

(DEFSCHEMA INSTANCE53
    (INSTANCE-OF IRIS-EXAMPLES)
    (PETAL-LENGTH 4.9)
    (PETAL-WIDTH 1.5)
    (SEPAL-LENGTH 6.9)
    (SEPAL-WIDTH 3.1)
```

```
    (ACTION CLASSIFY-AS-IRIS-VERSICOLOR))

(DEFSCHEMA INSTANCE54
   (INSTANCE-OF IRIS-EXAMPLES)
   (PETAL-LENGTH 4.0)
   (PETAL-WIDTH 1.3)
   (SEPAL-LENGTH 5.5)
   (SEPAL-WIDTH 2.3)
   (ACTION CLASSIFY-AS-IRIS-VERSICOLOR))

(DEFSCHEMA INSTANCE55
   (INSTANCE-OF IRIS-EXAMPLES)
   (PETAL-LENGTH 4.6)
   (PETAL-WIDTH 1.5)
   (SEPAL-LENGTH 6.5)
   (SEPAL-WIDTH 2.8)
   (ACTION CLASSIFY-AS-IRIS-VERSICOLOR))

(DEFSCHEMA INSTANCE56
   (INSTANCE-OF IRIS-EXAMPLES)
   (PETAL-LENGTH 4.5)
   (PETAL-WIDTH 1.3)
   (SEPAL-LENGTH 5.7)
   (SEPAL-WIDTH 2.8)
   (ACTION CLASSIFY-AS-IRIS-VERSICOLOR))

(DEFSCHEMA INSTANCE57
   (INSTANCE-OF IRIS-EXAMPLES)
   (PETAL-LENGTH 4.7)
   (PETAL-WIDTH 1.6)
   (SEPAL-LENGTH 6.3)
   (SEPAL-WIDTH 3.3)
   (ACTION CLASSIFY-AS-IRIS-VERSICOLOR))

(DEFSCHEMA INSTANCE58
   (INSTANCE-OF IRIS-EXAMPLES)
   (PETAL-LENGTH 3.3)
   (PETAL-WIDTH 1.0)
   (SEPAL-LENGTH 4.9)
   (SEPAL-WIDTH 2.4)
   (ACTION CLASSIFY-AS-IRIS-VERSICOLOR))

(DEFSCHEMA INSTANCE59
   (INSTANCE-OF IRIS-EXAMPLES)
   (PETAL-LENGTH 4.6)
   (PETAL-WIDTH 1.3)
   (SEPAL-LENGTH 6.6)
   (SEPAL-WIDTH 2.9)
   (ACTION CLASSIFY-AS-IRIS-VERSICOLOR))

(DEFSCHEMA INSTANCE6
   (INSTANCE-OF IRIS-EXAMPLES)
   (PETAL-LENGTH 1.7)
   (PETAL-WIDTH 0.4)
   (SEPAL-LENGTH 5.4)
   (SEPAL-WIDTH 3.9)
   (ACTION CLASSIFY-AS-IRIS-SETOSA))

(DEFSCHEMA INSTANCE60
   (INSTANCE-OF IRIS-EXAMPLES)
```

```
    (PETAL-LENGTH 3.9)
    (PETAL-WIDTH 1.4)
    (SEPAL-LENGTH 5.2)
    (SEPAL-WIDTH 2.7)
    (ACTION CLASSIFY-AS-IRIS-VERSICOLOR))

(DEFSCHEMA INSTANCE61
    (INSTANCE-OF IRIS-EXAMPLES)
    (PETAL-LENGTH 3.5)
    (PETAL-WIDTH 1.0)
    (SEPAL-LENGTH 5.0)
    (SEPAL-WIDTH 2.0)
    (ACTION CLASSIFY-AS-IRIS-VERSICOLOR))

(DEFSCHEMA INSTANCE62
    (INSTANCE-OF IRIS-EXAMPLES)
    (PETAL-LENGTH 4.2)
    (PETAL-WIDTH 1.5)
    (SEPAL-LENGTH 5.9)
    (SEPAL-WIDTH 3.0)
    (ACTION CLASSIFY-AS-IRIS-VERSICOLOR))

(DEFSCHEMA INSTANCE63
    (INSTANCE-OF IRIS-EXAMPLES)
    (PETAL-LENGTH 4.0)
    (PETAL-WIDTH 1.0)
    (SEPAL-LENGTH 6.0)
    (SEPAL-WIDTH 2.2)
    (ACTION CLASSIFY-AS-IRIS-VERSICOLOR))

(DEFSCHEMA INSTANCE64
    (INSTANCE-OF IRIS-EXAMPLES)
    (PETAL-LENGTH 4.7)
    (PETAL-WIDTH 1.4)
    (SEPAL-LENGTH 6.1)
    (SEPAL-WIDTH 2.9)
    (ACTION CLASSIFY-AS-IRIS-VERSICOLOR))

(DEFSCHEMA INSTANCE65
    (INSTANCE-OF IRIS-EXAMPLES)
    (PETAL-LENGTH 3.6)
    (PETAL-WIDTH 1.3)
    (SEPAL-LENGTH 5.6)
    (SEPAL-WIDTH 2.9)
    (ACTION CLASSIFY-AS-IRIS-VERSICOLOR))

(DEFSCHEMA INSTANCE66
    (INSTANCE-OF IRIS-EXAMPLES)
    (PETAL-LENGTH 4.4)
    (PETAL-WIDTH 1.4)
    (SEPAL-LENGTH 6.7)
    (SEPAL-WIDTH 3.1)
    (ACTION CLASSIFY-AS-IRIS-VERSICOLOR))

(DEFSCHEMA INSTANCE67
    (INSTANCE-OF IRIS-EXAMPLES)
    (PETAL-LENGTH 4.5)
    (PETAL-WIDTH 1.5)
    (SEPAL-LENGTH 5.6)
    (SEPAL-WIDTH 3.0)
```

```
     (ACTION CLASSIFY-AS-IRIS-VERSICOLOR))

(DEFSCHEMA INSTANCE68
  (INSTANCE-OF IRIS-EXAMPLES)
  (PETAL-LENGTH 4.1)
  (PETAL-WIDTH 1.0)
  (SEPAL-LENGTH 5.8)
  (SEPAL-WIDTH 2.7)
  (ACTION CLASSIFY-AS-IRIS-VERSICOLOR))

(DEFSCHEMA INSTANCE69
  (INSTANCE-OF IRIS-EXAMPLES)
  (PETAL-LENGTH 4.5)
  (PETAL-WIDTH 1.5)
  (SEPAL-LENGTH 6.2)
  (SEPAL-WIDTH 2.2)
  (ACTION CLASSIFY-AS-IRIS-VERSICOLOR))

(DEFSCHEMA INSTANCE7
  (INSTANCE-OF IRIS-EXAMPLES)
  (PETAL-LENGTH 1.4)
  (PETAL-WIDTH 0.3)
  (SEPAL-LENGTH 4.6)
  (SEPAL-WIDTH 3.4)
  (ACTION CLASSIFY-AS-IRIS-SETOSA))

(DEFSCHEMA INSTANCE70
  (INSTANCE-OF IRIS-EXAMPLES)
  (PETAL-LENGTH 3.9)
  (PETAL-WIDTH 1.1)
  (SEPAL-LENGTH 5.6)
  (SEPAL-WIDTH 2.5)
  (ACTION CLASSIFY-AS-IRIS-VERSICOLOR))

(DEFSCHEMA INSTANCE71
  (INSTANCE-OF IRIS-EXAMPLES)
  (PETAL-LENGTH 4.8)
  (PETAL-WIDTH 1.8)
  (SEPAL-LENGTH 5.9)
  (SEPAL-WIDTH 3.2)
  (ACTION CLASSIFY-AS-IRIS-VERSICOLOR))

(DEFSCHEMA INSTANCE72
  (INSTANCE-OF IRIS-EXAMPLES)
  (PETAL-LENGTH 4.0)
  (PETAL-WIDTH 1.3)
  (SEPAL-LENGTH 6.1)
  (SEPAL-WIDTH 2.8)
  (ACTION CLASSIFY-AS-IRIS-VERSICOLOR))

(DEFSCHEMA INSTANCE73
  (INSTANCE-OF IRIS-EXAMPLES)
  (PETAL-LENGTH 4.9)
  (PETAL-WIDTH 1.5)
  (SEPAL-LENGTH 6.3)
  (SEPAL-WIDTH 2.5)
  (ACTION CLASSIFY-AS-IRIS-VERSICOLOR))

(DEFSCHEMA INSTANCE74
  (INSTANCE-OF IRIS-EXAMPLES)
```

```
    (PETAL-LENGTH 4.7)
    (PETAL-WIDTH 1.2)
    (SEPAL-LENGTH 6.1)
    (SEPAL-WIDTH 2.8)
    (ACTION CLASSIFY-AS-IRIS-VERSICOLOR))

(DEFSCHEMA INSTANCE75
    (INSTANCE-OF IRIS-EXAMPLES)
    (PETAL-LENGTH 4.3)
    (PETAL-WIDTH 1.3)
    (SEPAL-LENGTH 6.4)
    (SEPAL-WIDTH 2.9)
    (ACTION CLASSIFY-AS-IRIS-VERSICOLOR))

(DEFSCHEMA INSTANCE76
    (INSTANCE-OF IRIS-EXAMPLES)
    (PETAL-LENGTH 4.4)
    (PETAL-WIDTH 1.4)
    (SEPAL-LENGTH 6.6)
    (SEPAL-WIDTH 3.0)
    (ACTION CLASSIFY-AS-IRIS-VERSICOLOR))

(DEFSCHEMA INSTANCE77
    (INSTANCE-OF IRIS-EXAMPLES)
    (PETAL-LENGTH 4.8)
    (PETAL-WIDTH 1.4)
    (SEPAL-LENGTH 6.8)
    (SEPAL-WIDTH 2.8)
    (ACTION CLASSIFY-AS-IRIS-VERSICOLOR))

(DEFSCHEMA INSTANCE78
    (INSTANCE-OF IRIS-EXAMPLES)
    (PETAL-LENGTH 5.0)
    (PETAL-WIDTH 1.7)
    (SEPAL-LENGTH 6.7)
    (SEPAL-WIDTH 3.0)
    (ACTION CLASSIFY-AS-IRIS-VERSICOLOR))

(DEFSCHEMA INSTANCE79
    (INSTANCE-OF IRIS-EXAMPLES)
    (PETAL-LENGTH 4.5)
    (PETAL-WIDTH 1.5)
    (SEPAL-LENGTH 6.0)
    (SEPAL-WIDTH 2.9)
    (ACTION CLASSIFY-AS-IRIS-VERSICOLOR))

(DEFSCHEMA INSTANCE8
    (INSTANCE-OF IRIS-EXAMPLES)
    (PETAL-LENGTH 1.5)
    (PETAL-WIDTH 0.2)
    (SEPAL-LENGTH 5.0)
    (SEPAL-WIDTH 3.4)
    (ACTION CLASSIFY-AS-IRIS-SETOSA))

(DEFSCHEMA INSTANCE80
    (INSTANCE-OF IRIS-EXAMPLES)
    (PETAL-LENGTH 3.5)
    (PETAL-WIDTH 1.0)
    (SEPAL-LENGTH 5.7)
    (SEPAL-WIDTH 2.6)
```

```
        (ACTION CLASSIFY-AS-IRIS-VERSICOLOR))

(DEFSCHEMA INSTANCE81
   (INSTANCE-OF IRIS-EXAMPLES)
   (PETAL-LENGTH 3.8)
   (PETAL-WIDTH 1.1)
   (SEPAL-LENGTH 5.5)
   (SEPAL-WIDTH 2.4)
   (ACTION CLASSIFY-AS-IRIS-VERSICOLOR))

(DEFSCHEMA INSTANCE82
   (INSTANCE-OF IRIS-EXAMPLES)
   (PETAL-LENGTH 3.7)
   (PETAL-WIDTH 1.0)
   (SEPAL-LENGTH 5.5)
   (SEPAL-WIDTH 2.4)
   (ACTION CLASSIFY-AS-IRIS-VERSICOLOR))

(DEFSCHEMA INSTANCE83
   (INSTANCE-OF IRIS-EXAMPLES)
   (PETAL-LENGTH 3.9)
   (PETAL-WIDTH 1.2)
   (SEPAL-LENGTH 5.8)
   (SEPAL-WIDTH 2.7)
   (ACTION CLASSIFY-AS-IRIS-VERSICOLOR))

(DEFSCHEMA INSTANCE84
   (INSTANCE-OF IRIS-EXAMPLES)
   (PETAL-LENGTH 5.1)
   (PETAL-WIDTH 1.6)
   (SEPAL-LENGTH 6.0)
   (SEPAL-WIDTH 2.7)
   (ACTION CLASSIFY-AS-IRIS-VERSICOLOR))

(DEFSCHEMA INSTANCE85
   (INSTANCE-OF IRIS-EXAMPLES)
   (PETAL-LENGTH 4.5)
   (PETAL-WIDTH 1.5)
   (SEPAL-LENGTH 5.4)
   (SEPAL-WIDTH 3.0)
   (ACTION CLASSIFY-AS-IRIS-VERSICOLOR))

(DEFSCHEMA INSTANCE86
   (INSTANCE-OF IRIS-EXAMPLES)
   (PETAL-LENGTH 4.5)
   (PETAL-WIDTH 1.6)
   (SEPAL-LENGTH 6.0)
   (SEPAL-WIDTH 3.4)
   (ACTION CLASSIFY-AS-IRIS-VERSICOLOR))

(DEFSCHEMA INSTANCE87
   (INSTANCE-OF IRIS-EXAMPLES)
   (PETAL-LENGTH 4.7)
   (PETAL-WIDTH 1.5)
   (SEPAL-LENGTH 6.7)
   (SEPAL-WIDTH 3.1)
   (ACTION CLASSIFY-AS-IRIS-VERSICOLOR))

(DEFSCHEMA INSTANCE88
   (INSTANCE-OF IRIS-EXAMPLES)
```

```
    (PETAL-LENGTH 4.4)
    (PETAL-WIDTH 1.3)
    (SEPAL-LENGTH 6.3)
    (SEPAL-WIDTH 2.3)
    (ACTION CLASSIFY-AS-IRIS-VERSICOLOR))

(DEFSCHEMA INSTANCE89
    (INSTANCE-OF IRIS-EXAMPLES)
    (PETAL-LENGTH 4.1)
    (PETAL-WIDTH 1.3)
    (SEPAL-LENGTH 5.6)
    (SEPAL-WIDTH 3.0)
    (ACTION CLASSIFY-AS-IRIS-VERSICOLOR))

(DEFSCHEMA INSTANCE9
    (INSTANCE-OF IRIS-EXAMPLES)
    (PETAL-LENGTH 1.4)
    (PETAL-WIDTH 0.2)
    (SEPAL-LENGTH 4.4)
    (SEPAL-WIDTH 2.9)
    (ACTION CLASSIFY-AS-IRIS-SETOSA))

(DEFSCHEMA INSTANCE90
    (INSTANCE-OF IRIS-EXAMPLES)
    (PETAL-LENGTH 4.0)
    (PETAL-WIDTH 1.3)
    (SEPAL-LENGTH 5.5)
    (SEPAL-WIDTH 2.5)
    (ACTION CLASSIFY-AS-IRIS-VERSICOLOR))

(DEFSCHEMA INSTANCE91
    (INSTANCE-OF IRIS-EXAMPLES)
    (PETAL-LENGTH 4.4)
    (PETAL-WIDTH 1.2)
    (SEPAL-LENGTH 5.5)
    (SEPAL-WIDTH 2.6)
    (ACTION CLASSIFY-AS-IRIS-VERSICOLOR))

(DEFSCHEMA INSTANCE92
    (INSTANCE-OF IRIS-EXAMPLES)
    (PETAL-LENGTH 4.6)
    (PETAL-WIDTH 1.4)
    (SEPAL-LENGTH 6.1)
    (SEPAL-WIDTH 3.0)
    (ACTION CLASSIFY-AS-IRIS-VERSICOLOR))

(DEFSCHEMA INSTANCE93
    (INSTANCE-OF IRIS-EXAMPLES)
    (PETAL-LENGTH 4.0)
    (PETAL-WIDTH 1.2)
    (SEPAL-LENGTH 5.8)
    (SEPAL-WIDTH 2.6)
    (ACTION CLASSIFY-AS-IRIS-VERSICOLOR))

(DEFSCHEMA INSTANCE94
    (INSTANCE-OF IRIS-EXAMPLES)
    (PETAL-LENGTH 3.3)
    (PETAL-WIDTH 1.0)
    (SEPAL-LENGTH 5.0)
    (SEPAL-WIDTH 2.3)
```

```
    (ACTION CLASSIFY-AS-IRIS-VERSICOLOR))

(DEFSCHEMA INSTANCE95
   (INSTANCE-OF IRIS-EXAMPLES)
   (PETAL-LENGTH 4.2)
   (PETAL-WIDTH 1.3)
   (SEPAL-LENGTH 5.6)
   (SEPAL-WIDTH 2.7)
   (ACTION CLASSIFY-AS-IRIS-VERSICOLOR))

(DEFSCHEMA INSTANCE96
   (INSTANCE-OF IRIS-EXAMPLES)
   (PETAL-LENGTH 4.2)
   (PETAL-WIDTH 1.2)
   (SEPAL-LENGTH 5.7)
   (SEPAL-WIDTH 3.0)
   (ACTION CLASSIFY-AS-IRIS-VERSICOLOR))

(DEFSCHEMA INSTANCE97
   (INSTANCE-OF IRIS-EXAMPLES)
   (PETAL-LENGTH 4.2)
   (PETAL-WIDTH 1.3)
   (SEPAL-LENGTH 5.7)
   (SEPAL-WIDTH 2.9)
   (ACTION CLASSIFY-AS-IRIS-VERSICOLOR))

(DEFSCHEMA INSTANCE98
   (INSTANCE-OF IRIS-EXAMPLES)
   (PETAL-LENGTH 4.3)
   (PETAL-WIDTH 1.3)
   (SEPAL-LENGTH 6.2)
   (SEPAL-WIDTH 2.9)
   (ACTION CLASSIFY-AS-IRIS-VERSICOLOR))

(DEFSCHEMA INSTANCE99
   (INSTANCE-OF IRIS-EXAMPLES)
   (PETAL-LENGTH 3.0)
   (PETAL-WIDTH 1.1)
   (SEPAL-LENGTH 5.1)
   (SEPAL-WIDTH 2.5)
   (ACTION CLASSIFY-AS-IRIS-VERSICOLOR))
```

I claim:

1. An autonomous software agent for operating in an environment, comprising a sensor for gathering information from said environment;

an effector for manipulating said environment;

a case base having a plurality of exemplar cases, each of said exemplar cases comprising a designated action, at least some of said actions comprising gathering information;

an inference engine for performing case-based reasoning steps in response to said cases; and means for altering said case base in response to reinforcement from said environment;

means for selecting a set of matching cases from said case base having a random effect or a pseudorandom effect;

wherein said means for selecting a set of matching cases from said case base comprises means for selecting a first case over a second case with a likelihood that is linearly proportional to a ratio of a measure of case accuracy of said first case over said second case.

2. An autonomous software agent as in claim 1, wherein said means for altering comprises means for altering said case base in response to an evaluation of said agent.

3. An autonomous software agent as in claim 1, comprising wherein said case base comprises a memory of cases, at least part of said memory being determined by a genetic technique; and wherein said case-based reasoning steps comprise taking selected actions in response to said cases, and at least some of said actions comprise gathering information.

4. An autonomous software agent as in claim 3, wherein said means for altering comprises means for altering said case base in response to an evaluation of said agent.

5. An autonomous software agent as in claim 3, wherein said means for selecting a case for case-based reasoning is responsive to a plurality of measures.

6. An autonomous software agent as in claim 5, wherein said means for selecting comprises means for selecting a case in response to match quality, case accuracy, or case utility.

7. An autonomous software agent as in claim 3, wherein said means for selecting a case for case-based reasoning comprises means for inducing experimentation by the autonomous agent.

8. An autonomous software agent as in claim 7, wherein said means for selecting a case comprises means for generating a random or pseudorandom effect.

9. An autonomous software agent as in claim 8, wherein said means for selecting a case comprises means for inducing experimentation by said agent.

10. An autonomous software agent as in claim 3, comprising means for cooperating with a second autonomous software agent in selecting an action to be performed.

11. An autonomous software agent as in claim 1, comprising a receptor coupled to said environment and generating a features message;

wherein said inference engine is coupled to said receptor, said inference engine comprising said case base, said means for selecting a set of matching cases from said case base, at least one case in said case base comprising a designated action including a step of gathering information, means for altering said case base using a genetic technique in response to said features message and in response to a reinforcement from said environment, and means for generating a commands message in response to said set of matching cases; and wherein said effector is coupled to said environment and operates on said environment in response to said commands message.

12. An autonomous software agent as in claim 11, wherein said means for altering comprises means for generating a case which has not been encountered in said environment;

means for evaluating a case in response to (a) a set of matching cases, or (b) said reinforcement; and means for selecting a limited set of cases which provides a preferred model of said environment.

13. An autonomous software agent as in claim 1, comprising a receptor coupled to said environment and generating a features message;

wherein said inference engine is coupled to said receptor, said inference engine comprising said case base, said means for selecting a set of matching cases from said case base, means for altering said case base using a genetic technique in response to said features message and in response to a reinforcement from said environment, and means for generating a commands message in response to said set of matching cases; and wherein said effector is coupled to said environment and operates on said environment in response to said commands message;

wherein said means for selecting a set of matching cases from said case base comprises means for generating a random effect or a pseudorandom effect.

14. An autonomous software agent as in claim 1, wherein said means for selecting a set of matching cases from said case base comprises means for applying a random effect or a pseudorandom effect to a measure of match quality, case accuracy, or case utility.

15. An autonomous software agent as in claim 1, wherein said means for selecting a set of matching cases from said case base is more likely to select a case with a greater measure of match quality, case accuracy, or case utility.

16. An autonomous software agent as in claim 1, wherein substantially all of said cases comprise a set of matchable features;

an action to be taken when said case is selected; and a plurality of measures of value for said case.

17. An autonomous software agent as in claim 16, wherein at least one of said plurality of measures of value comprises match quality, case accuracy, or case utility.

18. An autonomous software agent as in claim 1, wherein said environment comprises a carpenter's bench, a chess program, a customer service system, a graphic database, a help-desk system, a knowledge discovery system, a loan portfolio database, a music audio database, an oil refinery, a piece of office equipment, or a physical room.

19. An autonomous software agent as in claim 1, comprising a receptor coupled to said environment and generating a features message;

wherein said inference engine is coupled to said receptor, said inference engine comprising said case base, said means for selecting a set of matching cases from said case base in response to a plurality of measures of case quality, means for altering said case base using a genetic technique in response to said features message and in response to a reinforcement from said environment, and means for generating a commands message in response to said set of matching cases; and wherein said effector is coupled to said environment and operates on said environment in response to said commands message.

20. An autonomous software agent as in claim 1 wherein each of said exemplar cases comprises a plurality of measures of case quality.

* * * * *

UNITED STATES PATENT AND TRADEMARK OFFICE
CERTIFICATE OF CORRECTION

PATENT NO. : 5,586,218
DATED : December 17, 1996
INVENTOR(S) : Bradley P. Allen

It is certified that error appears in the above-indentified patent and that said Letters Patent is hereby corrected as shown below:

ON THE TITLE PAGE:

---In the "References Cited" section, replace the Class and Subclass for Document No. 4,930,071, "364/300" with --395/77--.

---In the "Foreign Patent Documents" section, insert "Document No. 9207325, Date 4/1992, Lynch et al.".

---In the "Other Publications" section, insert "Stanfill, C. and Waltz, D.L., The Memory-Based Reasoning Paradigm, Proceedings of the DARPA Workshop on Case-Based Reasoning, May 1988.".

---In the "Other Publications" section, in the publication written by "Handelman, et al.", replace "Ingegrating" with --Integrating--.

---In the "Other Publications" section, in the publication written by Brooks, R. A., replace "Autonous" with --Autonomous--.

---In the "Other Publications" section, in the publication written by Arnold, S. P. and Stepoway, S. L., replace "Retrieival" with --Retrieval--.

---In the "Other Publications" section, in the publication written by Devanbu, P., Selfridge, P.G., Ballard, B. W. and Brachman, R. J., replace "Intellignece" with --Intelligence--.

UNITED STATES PATENT AND TRADEMARK OFFICE
CERTIFICATE OF CORRECTION

PATENT NO. : 5,586,218
DATED : December 17, 1996
INVENTOR(S) : Bradley P. Allen

It is certified that error appears in the above-indentified patent and that said Letters Patent is hereby corrected as shown below:

---In the "Other Publications" section, in the publication written by Goodman, replace "Texex" with --Telex--.

---On Col. 77, line 12, after "cases;" delete "and".

--- On Col. 77, line 14, after "environment;" insert --and--.

---On Col. 78, line 34, after "matching cases;" delete "and".

---On Col. 78, line 37, after "commands message;" insert --and--.

Signed and Sealed this

Thirteenth Day of May, 1997

*Attest:*

BRUCE LEHMAN

*Attesting Officer*  Commissioner of Patents and Trademarks